United States Patent
Braykovich et al.

(10) Patent No.: US 12,011,327 B2
(45) Date of Patent: Jun. 18, 2024

(54) SYSTEM AND METHOD OF REMOVING EXCESS MATERIAL FROM A DENTAL APPLIANCE

(71) Applicants: Axsys Inc., Wixom, MI (US); Steven Michael Braykovich, Walled Lake, MI (US); Thomas Benedetti, Suttons Bay, MI (US)

(72) Inventors: Steven Michael Braykovich, Walled Lake, MI (US); Thomas Anthony Benedetti, Suttons Bay, MI (US)

(73) Assignee: AXSYS INC., Wixom, MI (US)

( * ) Notice: Subject to any disclaimer, the term of this patent is extended or adjusted under 35 U.S.C. 154(b) by 650 days.

(21) Appl. No.: 17/168,167

(22) Filed: Feb. 4, 2021

(65) Prior Publication Data

US 2021/0236250 A1    Aug. 5, 2021

Related U.S. Application Data

(60) Provisional application No. 62/970,089, filed on Feb. 4, 2020.

(51) Int. Cl.

| | |
|---|---|
| *B33Y 80/00* | (2015.01) |
| *A61C 13/00* | (2006.01) |
| *A61C 13/34* | (2006.01) |
| *B23C 3/16* | (2006.01) |

(Continued)

(52) U.S. Cl.
CPC ...... *A61C 13/0004* (2013.01); *A61C 13/0019* (2013.01); *A61C 13/34* (2013.01);
(Continued)

(58) Field of Classification Search
CPC ..... A61C 7/002; A61C 13/0004; A61C 13/34; A61C 9/0046; A61C 13/0019; A61C 7/02; A61C 13/00; B33Y 80/00; B33Y 50/02; B33Y 40/20; G06T 19/20; G06T 19/00; G06T 2219/008; G05B 2219/45167; G05B 19/402; G05B 19/4099;

(Continued)

(56) References Cited

U.S. PATENT DOCUMENTS 5,273,422 A * 12/1993 Quin ................ B29C 37/02
                                                    264/161
5,684,713 A * 11/1997 Asada ................ B33Y 50/00
                                                    716/54

(Continued)

FOREIGN PATENT DOCUMENTS

EP          2101674 B1      5/2016
WO    WO-2019238344 A1 * 12/2019 ............ B25J 9/1666

*Primary Examiner* — Darrin D Dunn

(57) ABSTRACT

A system and a method allow for the removal of excess material from a dental appliance. The system includes at least one 5-axis computer numerical control (CNC) machine and at least one administrative computing system. The administrative computing system is used to determine the trim line for the dental appliance. The administrative computing system is also used to determine a tool path for an automated tool that is an integrated part of the 5-axis CNC machine. The tool path is then relayed from the administrative computing system to the 5-axis CNC machine. The 5-axis CNC machine is used to machine off the excess material from the dental appliance along the trim line, while the automated tool follows the tool path.

17 Claims, 34 Drawing Sheets

(51) Int. Cl.
*B29C 51/10* (2006.01)
*B29C 51/26* (2006.01)
*B29C 64/379* (2017.01)
*B33Y 40/20* (2020.01)
*G05B 19/4099* (2006.01)
*B29L 31/00* (2006.01)

(52) U.S. Cl.
CPC ............... *B23C 3/16* (2013.01); *B29C 51/10* (2013.01); *B29C 51/266* (2013.01); *B29C 64/379* (2017.08); *B33Y 40/20* (2020.01); *B33Y 80/00* (2014.12); *B29C 2793/009* (2013.01); *B29L 2031/753* (2013.01); *G05B 19/4099* (2013.01); *G05B 2219/33047* (2013.01); *G05B 2219/45167* (2013.01)

(58) Field of Classification Search
CPC ........... G05B 2219/49012; G06F 30/00; G06F 30/20; G06F 2119/18; G06F 3/04842
See application file for complete search history.

(56) References Cited

U.S. PATENT DOCUMENTS

| | | | |
|---|---|---|---|
| 5,901,270 A * | 5/1999 | Quin | B26F 3/06 264/161 |
| 7,092,784 B1 | 8/2006 | Simkins | |
| 8,368,717 B2 * | 2/2013 | Reghetti | G06T 19/00 345/619 |
| 10,162,338 B2 * | 12/2018 | Salour | G05B 19/4183 |
| 10,335,250 B2 | 7/2019 | Wen | |
| 10,869,489 B2 * | 12/2020 | Blaine | A22C 17/0086 |
| 11,648,087 B2 * | 5/2023 | Kopelman | A61C 7/002 433/214 |
| 2006/0093982 A1 | 5/2006 | Wen | |
| 2006/0275736 A1 | 12/2006 | Wen et al. | |
| 2008/0141534 A1 | 6/2008 | Hilliard | |
| 2008/0215176 A1 | 9/2008 | Borovinskih et al. | |
| 2010/0028117 A1 * | 2/2010 | Nihei | B25J 9/0009 414/728 |
| 2011/0196524 A1 * | 8/2011 | Giasson | B33Y 50/00 700/118 |
| 2018/0116762 A1 * | 5/2018 | Kopelman | A61C 7/002 |
| 2018/0290233 A1 * | 10/2018 | Sun | B23K 26/0093 |
| 2018/0303581 A1 | 10/2018 | Martz et al. | |
| 2018/0321671 A1 * | 11/2018 | Pistorius | B25J 11/005 |
| 2018/0333226 A1 | 11/2018 | Tsai et al. | |
| 2019/0102880 A1 | 4/2019 | Parpara | |
| 2019/0216633 A1 * | 7/2019 | Frantz | B29C 51/46 |
| 2019/0340748 A1 * | 11/2019 | Di Venuto Dayer, V | H04L 9/3278 |
| 2020/0281689 A1 * | 9/2020 | Yancey | A61B 5/0064 |
| 2023/0267690 A1 * | 8/2023 | Sugaya | G06T 19/003 345/419 |

* cited by examiner

SYSTEM AND METHOD OF REMOVING EXCESS MATERIAL FROM A DENTAL APPLIANCE

The current application claims a priority to the U.S. Provisional Patent application Ser. No. 62/970,089 filed on Feb. 4, 2020.

FIELD OF THE INVENTION

The present invention relates generally to data processing. More specifically, the present invention is systems and methods to facilitate the removal of excess material from a dental appliance.

BACKGROUND OF THE INVENTION

Conventional methods used to produce dental appliances include a dental impression method and a cast model method which are very cumbersome and imprecise methods. In addition, 3D CAD data required for the trimming process was developed by the use of intraoral and 3D desktop scanners. Further, the removal of excess material from a dental appliance was performed manually by human hands.

Existing techniques for the removal of excess material from a dental appliance are deficient with regard to several aspects. For instance, current technologies do not allow an automated trimming of the dental appliance. Furthermore, current technologies do not involve identification techniques to identify a trim line for the dental appliance. Moreover, current technologies do not allow a cost-effective and high-speed trimming of the dental appliance.

Therefore, there is a need for improved systems and methods to facilitate the removal of excess material from a dental appliance that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method to facilitate the removal of excess material from a dental appliance is disclosed. Accordingly, the method may include a step of printing a part model with a model identifier. Further, the method may include a step of transferring the part model to a vacuum station and an aligner material may be formed over the part model. Further, the method may include a step of transferring the aligner tray to a laser etching station. Further, the method may include a step of identifying whether an NC code exists for the aligner tray. Further, the method may include a step of developing a trim line on a digital model. Further, the method may include a step of submitting the trim line to a CAM system, wherein a toolpath may be developed and wherein an NC code may be generated for machining tools. Further, the method may include a step of verifying the NC code. Further, the method may include a step of identifying whether the NC code passes the verification. Further, the method may include a step of scanning the aligner tray and loading it into a 5-axis CNC machine.

Both the foregoing summary and the following detailed description provide examples and are explanatory only.

Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

All illustrations of the drawings are for the purpose of describing selected versions of the present invention and are not intended to limit the scope of the present invention.

Figure 1:
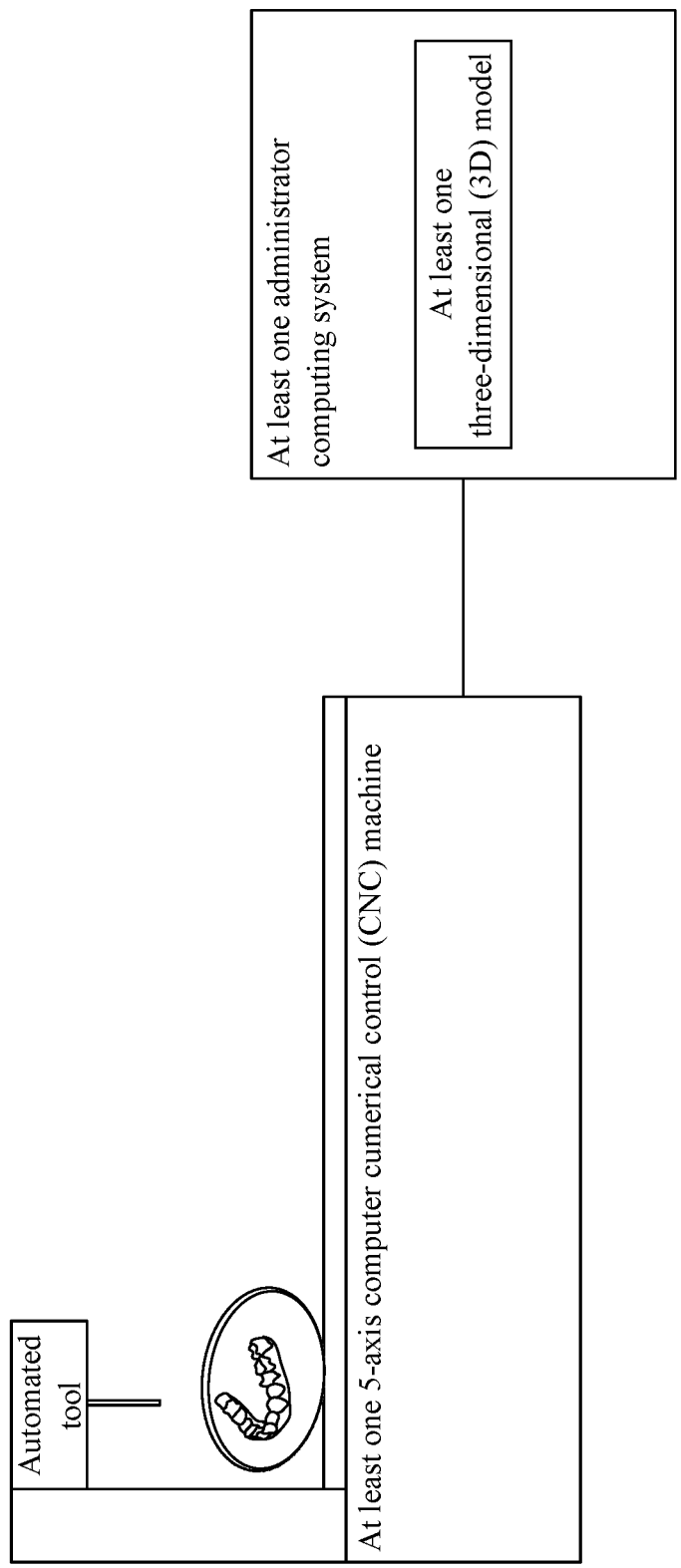
FIG. 1 is a block diagram illustrating the system of the present invention.

The present invention is a system and method of removing excess material from a dental appliance. As can be seen in FIG. 1, the system for implementing the method of the present invention is provided with at least one 5-axis computer numerical control (CNC) machine and at least one administrator computing system (Step A). The 5-axis CNC machine includes an automated tool. The administrator computing system manages at least one three-dimensional (3D) model (Step B), which is a virtual representation of at least one dental appliance. An example of the dental appliance is an aligner tray that is used for orthodontal purposes.

Figure 2:
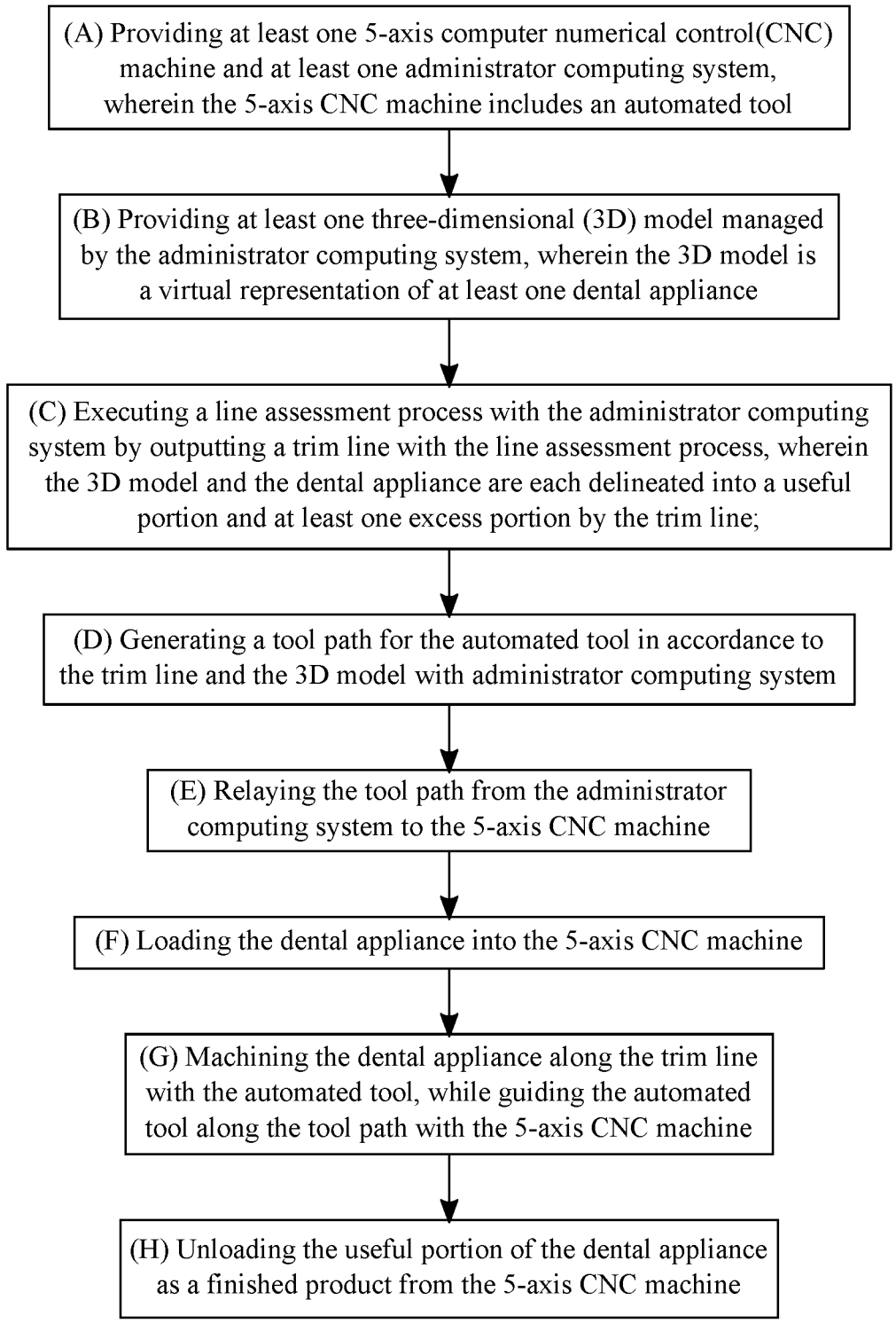
FIG. 2 is a flowchart illustrating an overall process for the method of the present invention.

As can be seen in FIG. 2, an overall process for the method of the present invention allows a user to effectively and efficiently transform the dental appliance into a final product. The overall process begins by executing a line assessment process with the administrator computing system by outputting a trim line with the line assessment process (Step C). The 3D model and the dental appliance are each delineated into a useful portion and at least one excess portion by the trim line. A tool path for the automated tool is generated in accordance to the trim line and the 3D model with administrator computing system (Step D). Thereafter, the tool path is relayed from the administrator computing system to the 5-axis CNC machine (Step E). The overall process continues by loading the dental appliance into the 5-axis CNC machine (Step F). The dental appliance is next machined along the trim line with the automated tool, while guiding the automated tool along the tool path with the 5-axis CNC machine (Step G). The overall process concludes by unloading the useful portion of the dental appliance as a finished product from the 5-axis CNC machine (Step H). After Step H, a laser etching machine can be used to mark the final product with an identifier (e.g., a batch number).

Figure 3:
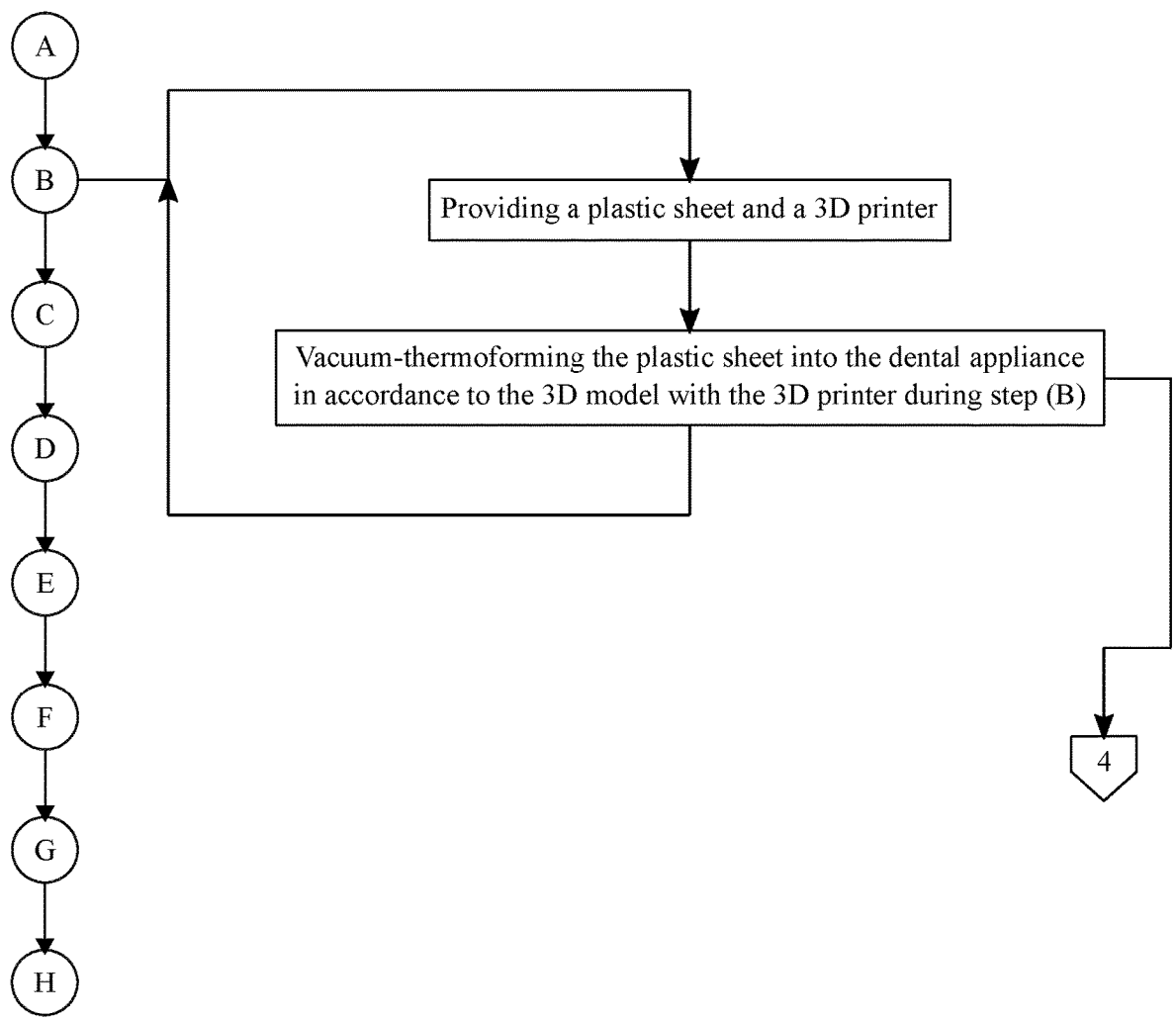
FIG. 3 is a flowchart illustrating a subprocess for vacuum-thermoforming the dental appliance.
Figure 4:
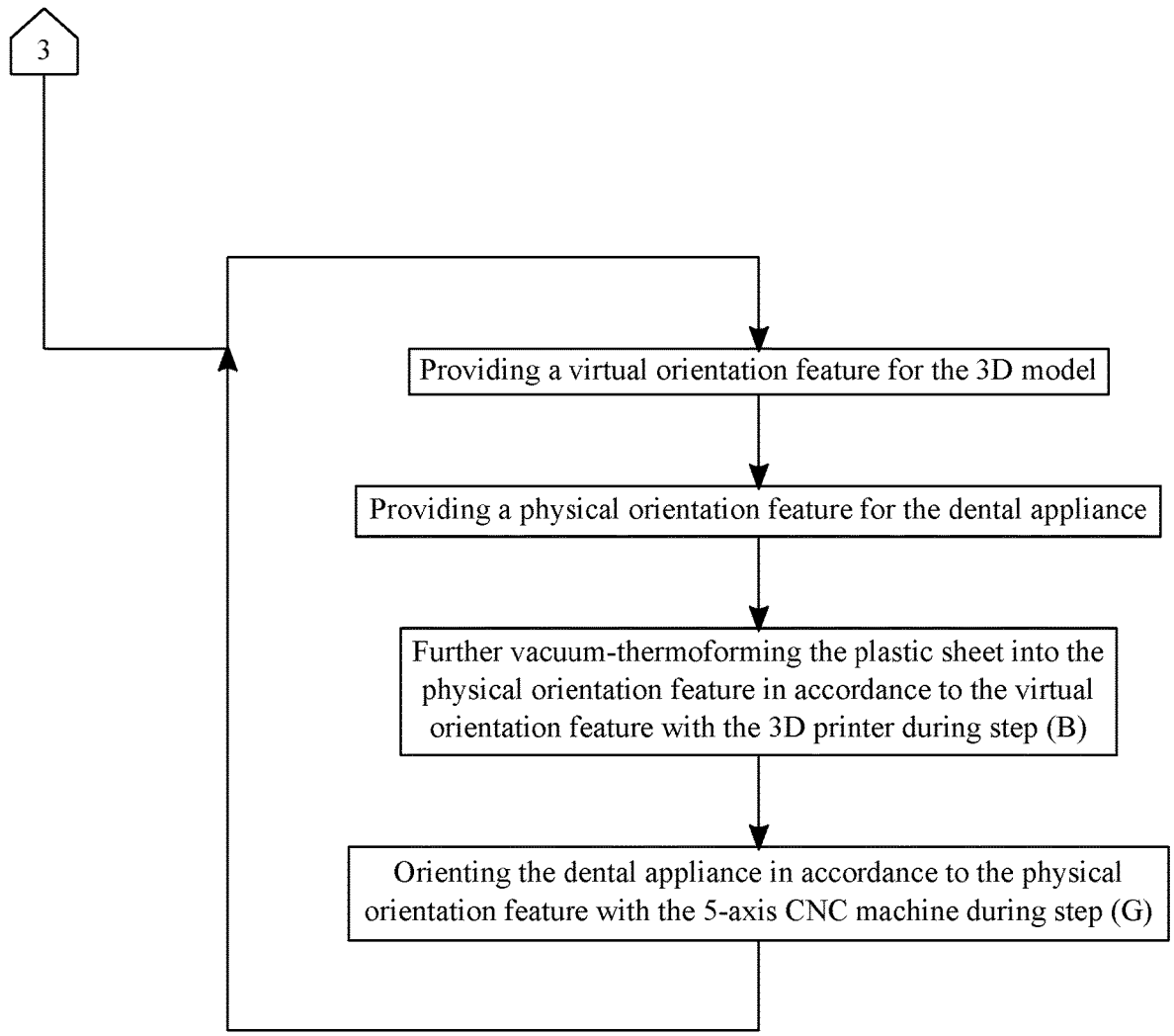
FIG. 4 is a flowchart illustrating a subprocess for vacuum-thermoforming an orientation feature for the dental appliance.

As can be seen in FIG. 3, one subprocess for the method of the present invention provides a plastic sheet and a 3D printer. Thus, the plastic sheet is vacuum-thermoformed into the dental appliance in accordance to the 3D model with the 3D printer during Step B. More specifically, this subprocess can provide a virtual orientation feature for the 3D model and a physical orientation feature for the dental appliance, which is shown in FIG. 4. Thus, the plastic sheet can be further vacuum-thermoformed into the physical orientation feature in accordance to the virtual orientation feature with the 3D printer during Step B. This subprocess consequently allows the dental appliance to be properly oriented in accordance to the physical orientation feature with the 5-axis CNC machine during Step G.

Figure 5:
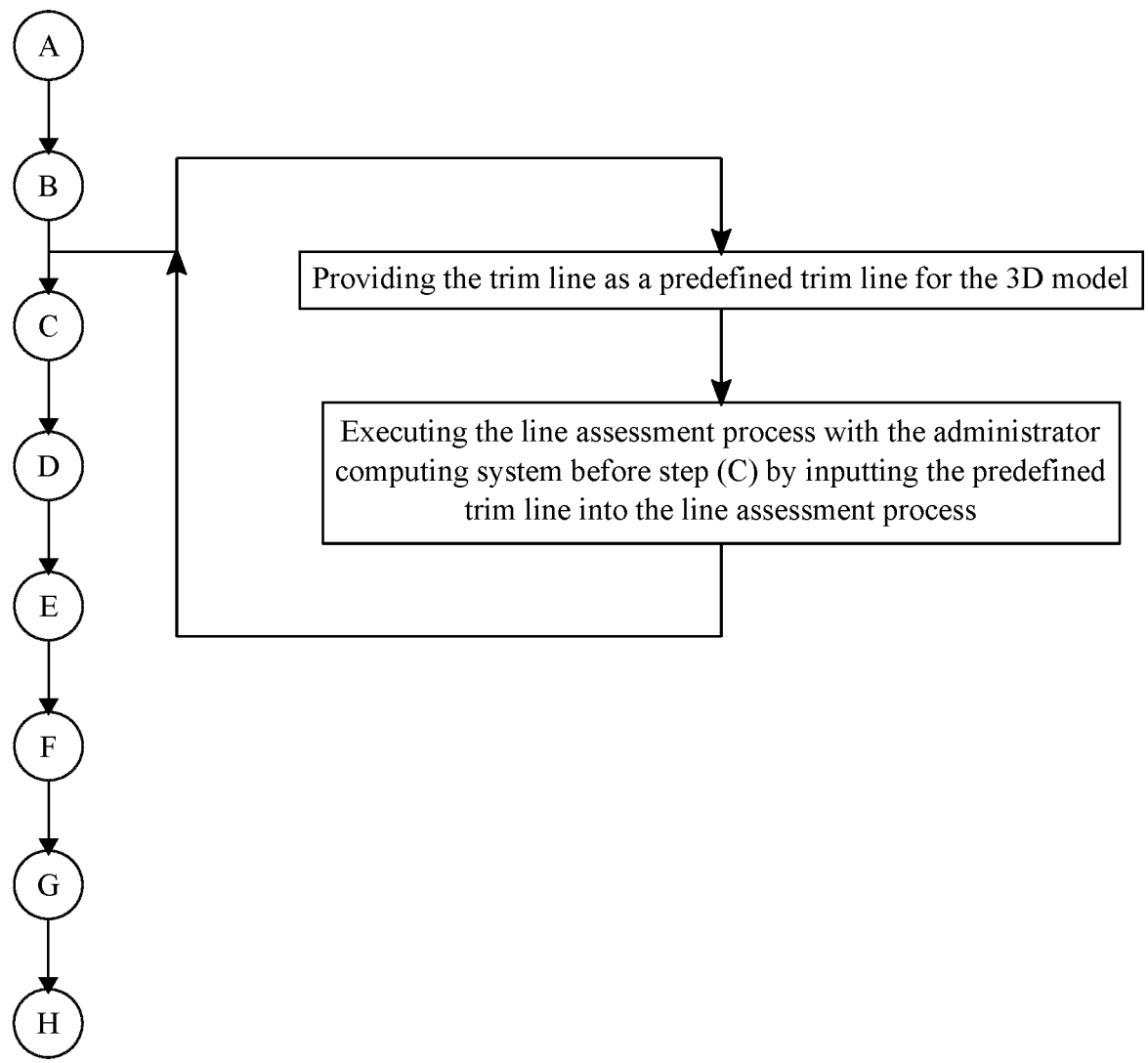
FIG. 5 is a flowchart illustrating a subprocess for using a predefined trim line to determine the trim line.

As can be seen in FIG. 5, another subprocess for the method of the present invention provides the trim line as a predefined trim line for the 3D model. The predefined trim line is typically retrieved from a third-party computer aided design (CAD) provider. Thus, the line assessment process is executed with the administrator computing system before Step C by inputting the predefined trim line into the line assessment process.

Figure 6:
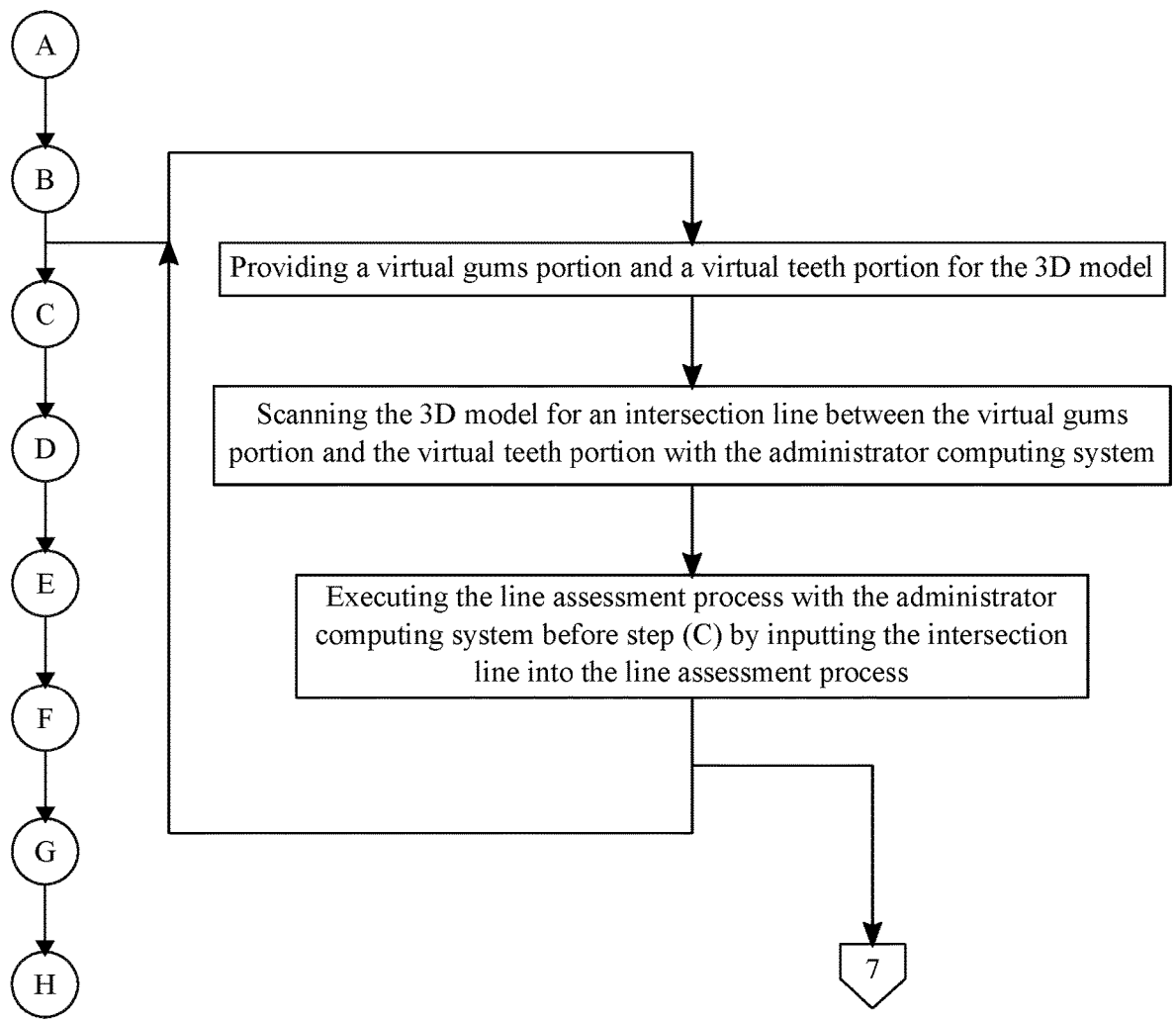
FIG. 6 is a flowchart illustrating a subprocess for using an intersection line between the gums and the teeth in order to determine the trim line.
Figure 7:
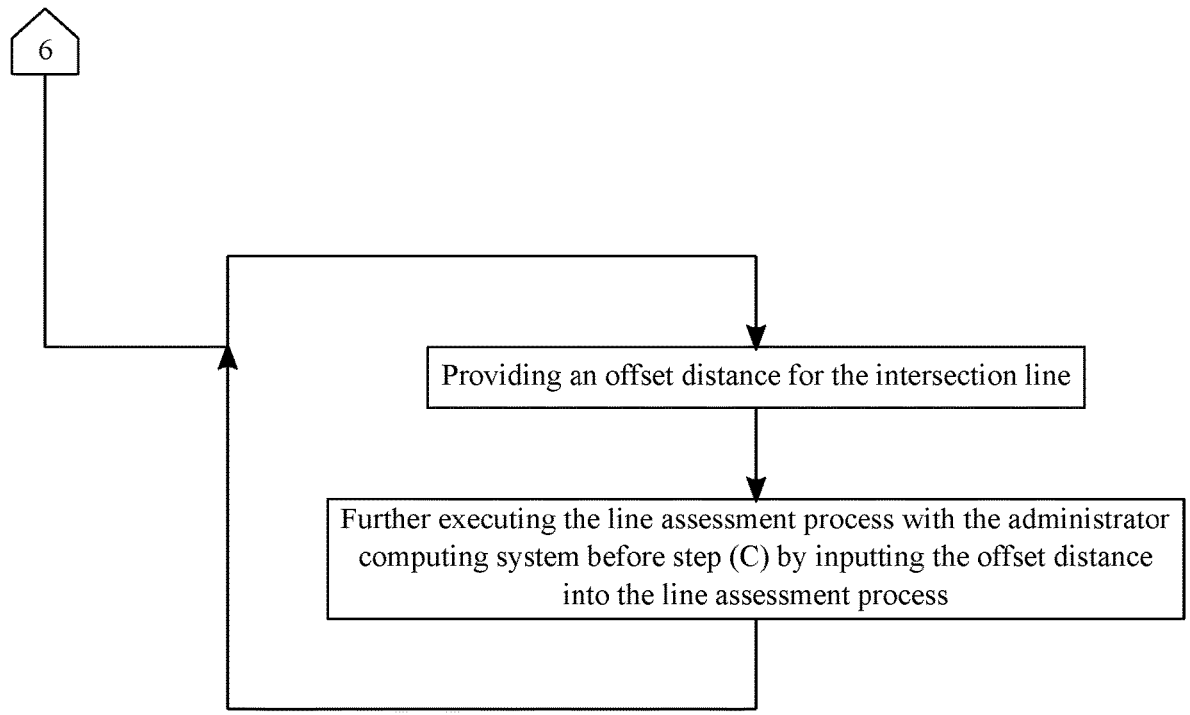
FIG. 7 is a flowchart illustrating a subprocess for adjusting the intersection line between the gums and teeth by an offset distance in order to determine a more optimal trim line.

As can be seen in FIG. 6, another subprocess for the method of the present invention provides a virtual gums portion and a virtual teeth portion for the 3D model. Thus, the 3D model is scanned for an intersection line between the virtual gums portion and the virtual teeth portion with the administrator computing system. Topological data of the 3D model may be used to scan for the intersection line. The line assessment process is then executed with the administrator computing system before Step C by inputting the intersection line into the line assessment process. More specifically, this subprocess can provide an offset distance for the intersection line, which is shown in FIG. 7. The line assessment process can be further executed with the administrator computing system before Step C by inputting the offset distance into the line assessment process.

Figure 8:
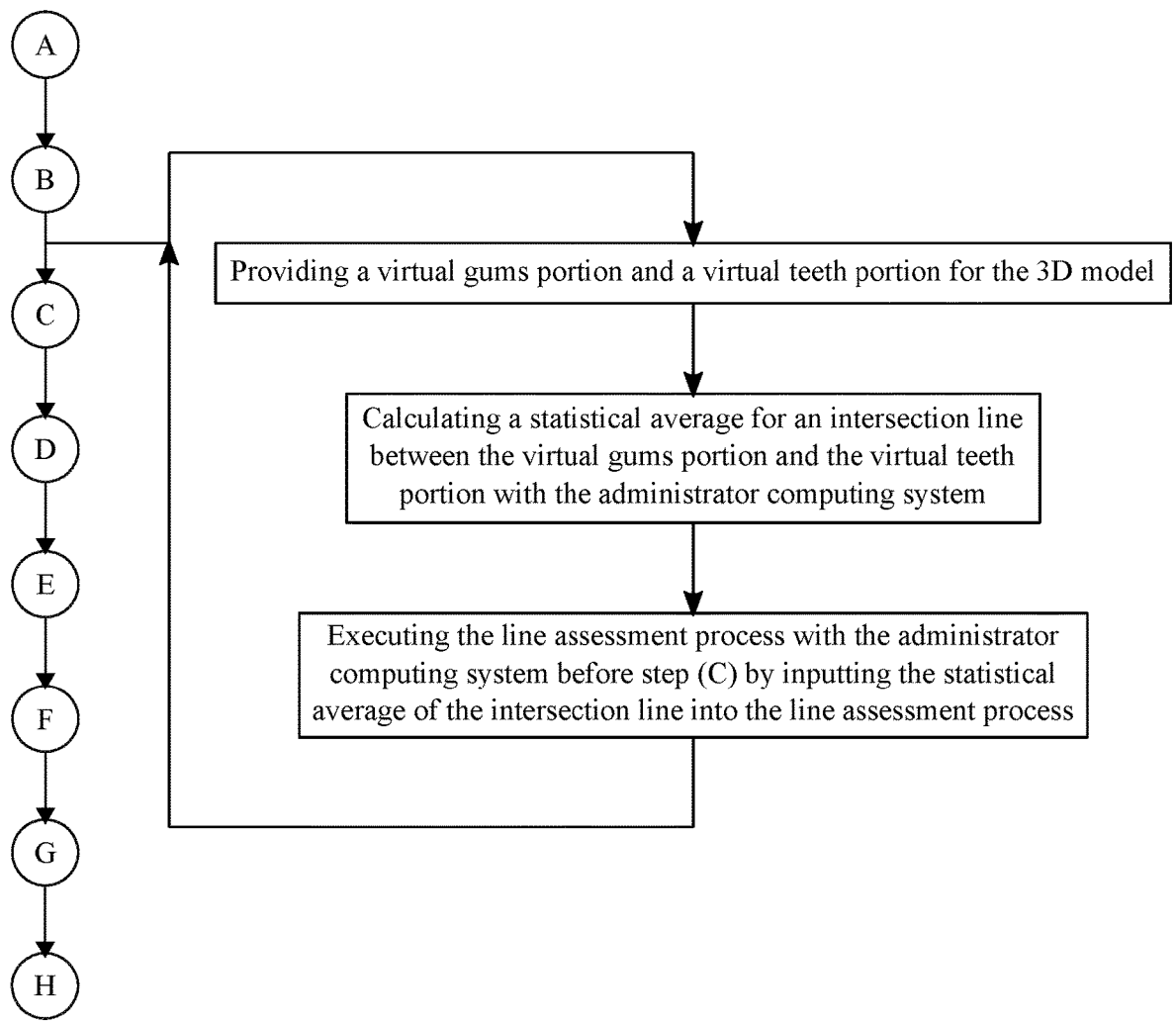
FIG. 8 is a flowchart illustrating a subprocess for statistically averaging an intersection line between the gums and the teeth in order to determine the trim line.

As can be seen in FIG. 8, another subprocess similarly provides a virtual gums portion and a virtual teeth portion for the 3D model. Thus, a statistical average for an intersection line is calculated between the virtual gums portion and the virtual teeth portion with the administrator computing system. The line assessment process is then executed with the administrator computing system before Step C by inputting the statistical average of the intersection line into the line assessment process.

Figure 9:
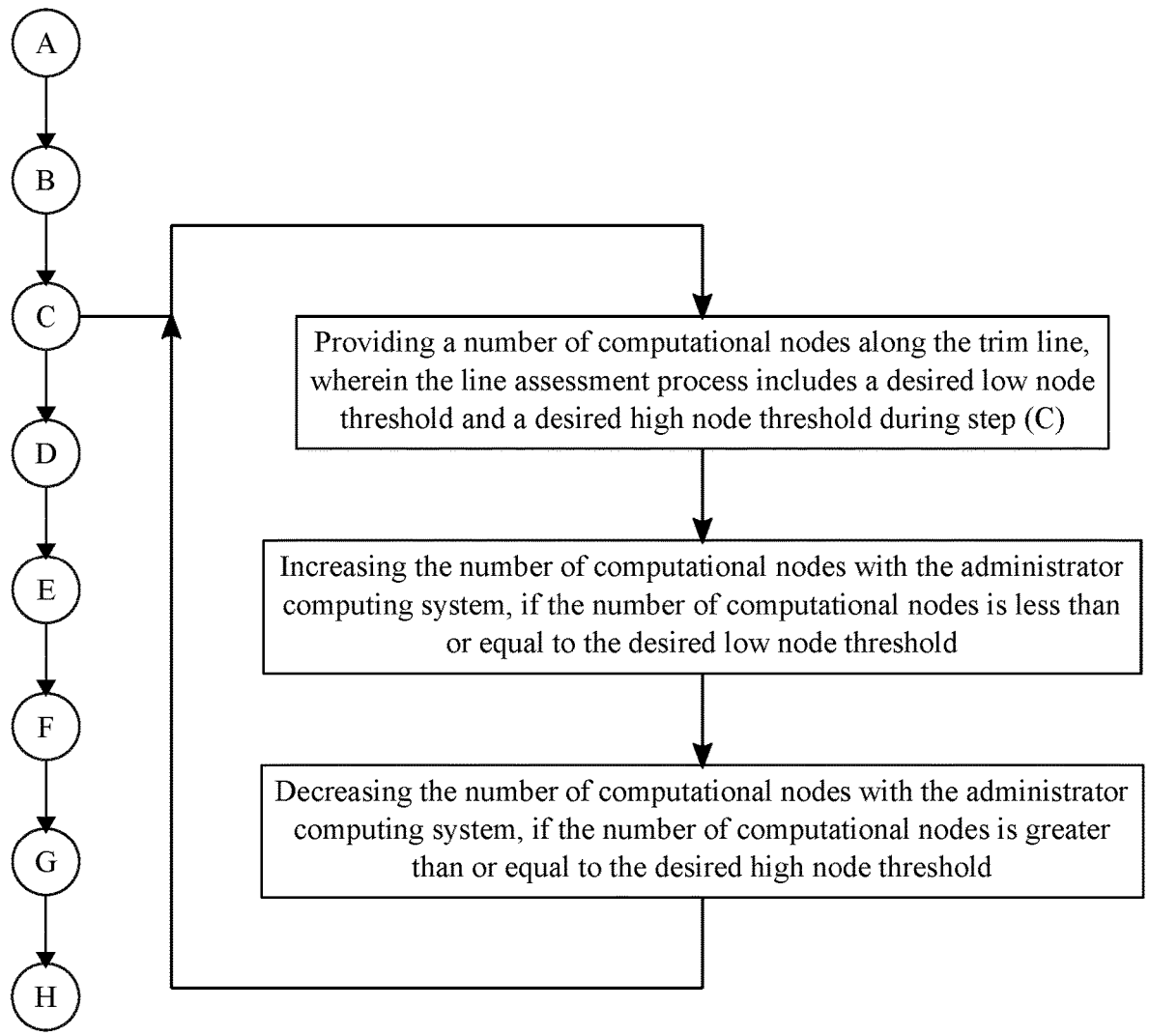
FIG. 9 is a flowchart illustrating a subprocess for smoothing out the trim line in order to optimize use of the trim line in the 5-axis CNC machine.

As can be seen in FIG. 9, another subprocess for the method of the present invention provides a number of computational nodes along the trim line during Step C. Moreover, the line assessment process includes a desired low node threshold and a desired high node threshold. Thus, the number of computational nodes is increased with the administrator computing system, if the number of computational nodes is less than or equal to the desired low node threshold. Alternatively, the number of computational nodes is decreased with the administrator computing system, if the number of computational nodes is greater than or equal to the desired high node threshold. For example, this subprocess allows the administrator computing system to smooth out a trim line that was initially derived as a jagged line, which allows for a better quality of trim line.

Figure 10:
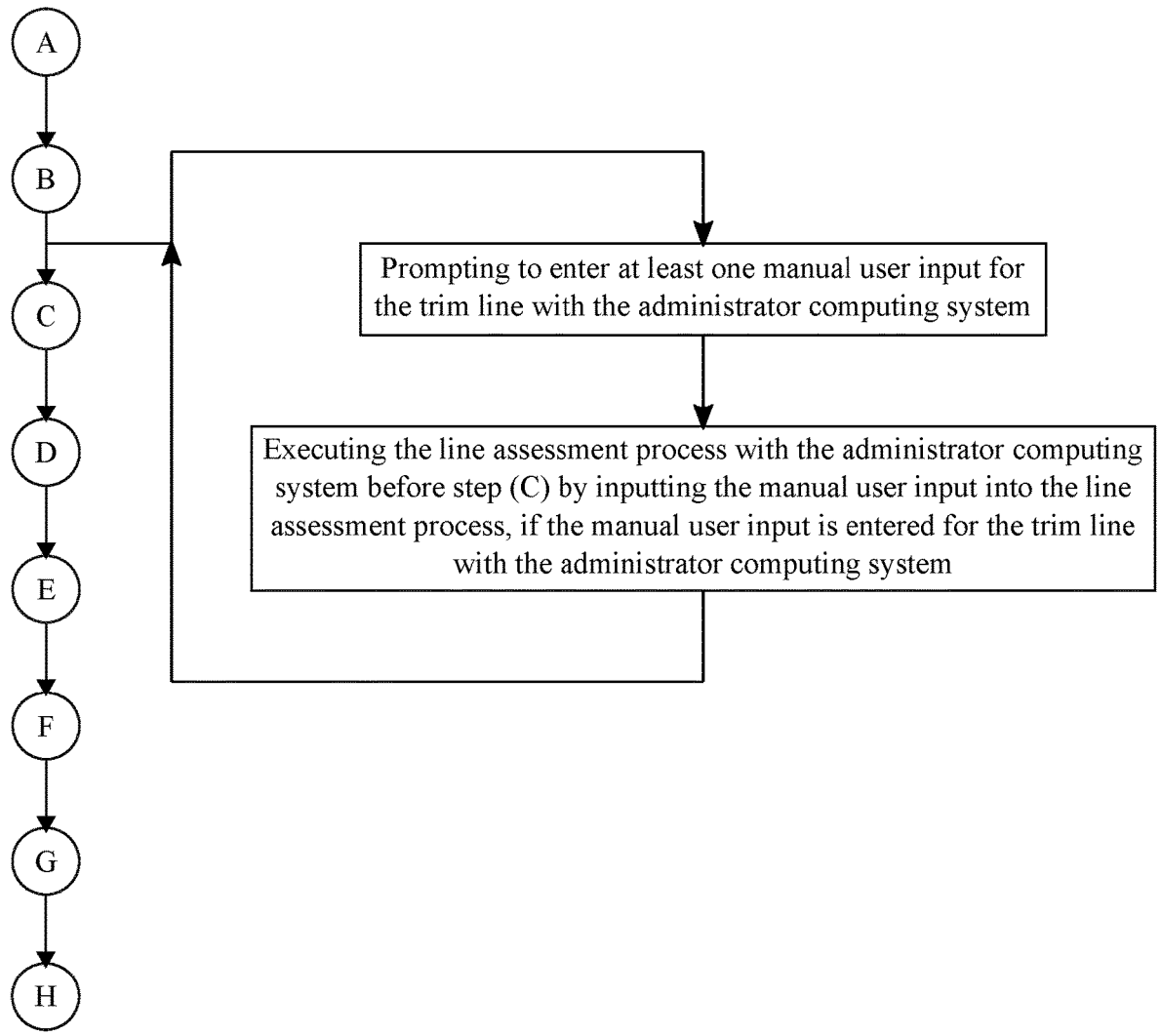
FIG. 10 is a flowchart illustrating a subprocess for adjusting the trim line based on a manual user input.

As can be seen in FIG. 10, another subprocess for the method of the present invention begins by prompting to enter at least one manual user input for the trim line with the administrator computing system. An example of a manual user input is to have the trim line cut over a specific molar. The line assessment process is then executed with the administrator computing system before Step C by inputting the manual user input into the line assessment process, if the manual user input is entered for the trim line with the administrator computing system.

Figure 11:
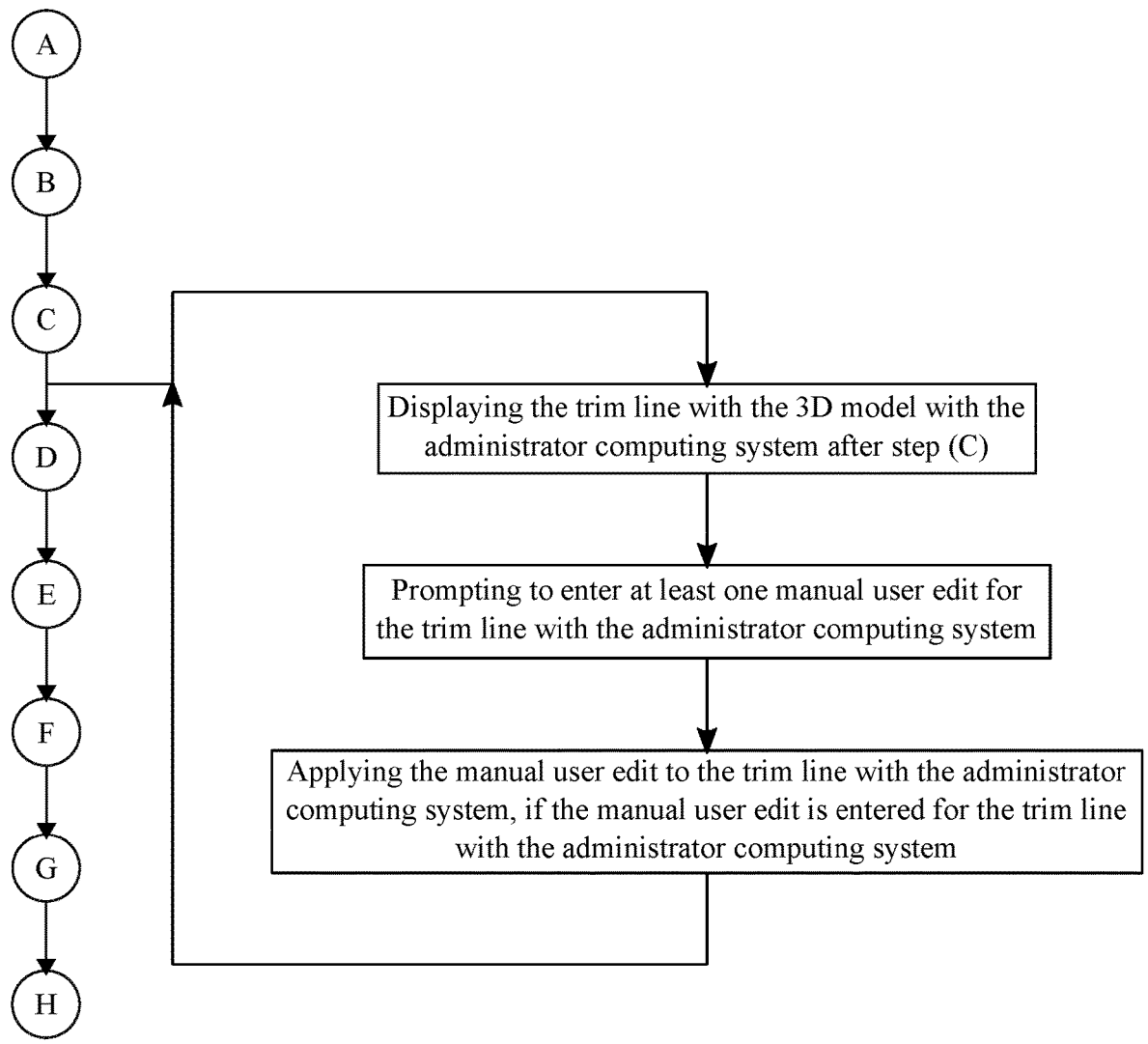
FIG. 11 is a flowchart illustrating a subprocess for viewing and adjusting the trim line by a manual user edit after determining the trim line.

As can be seen in FIG. 11, another subprocess for the method of the present invention begins by displaying the trim line with the 3D model with the administrator computing system after Step C. Thereafter, at least one manual user edit is prompted to be entered for the trim line with the administrator computing system. Consequently, the manual user edit is applied to the trim line with the administrator computing system, if the manual user edit is entered for the trim line with the administrator computing system. This subprocess allows for an interactive platform that allows a user to easily view and adjust the trim line.

Figure 12:
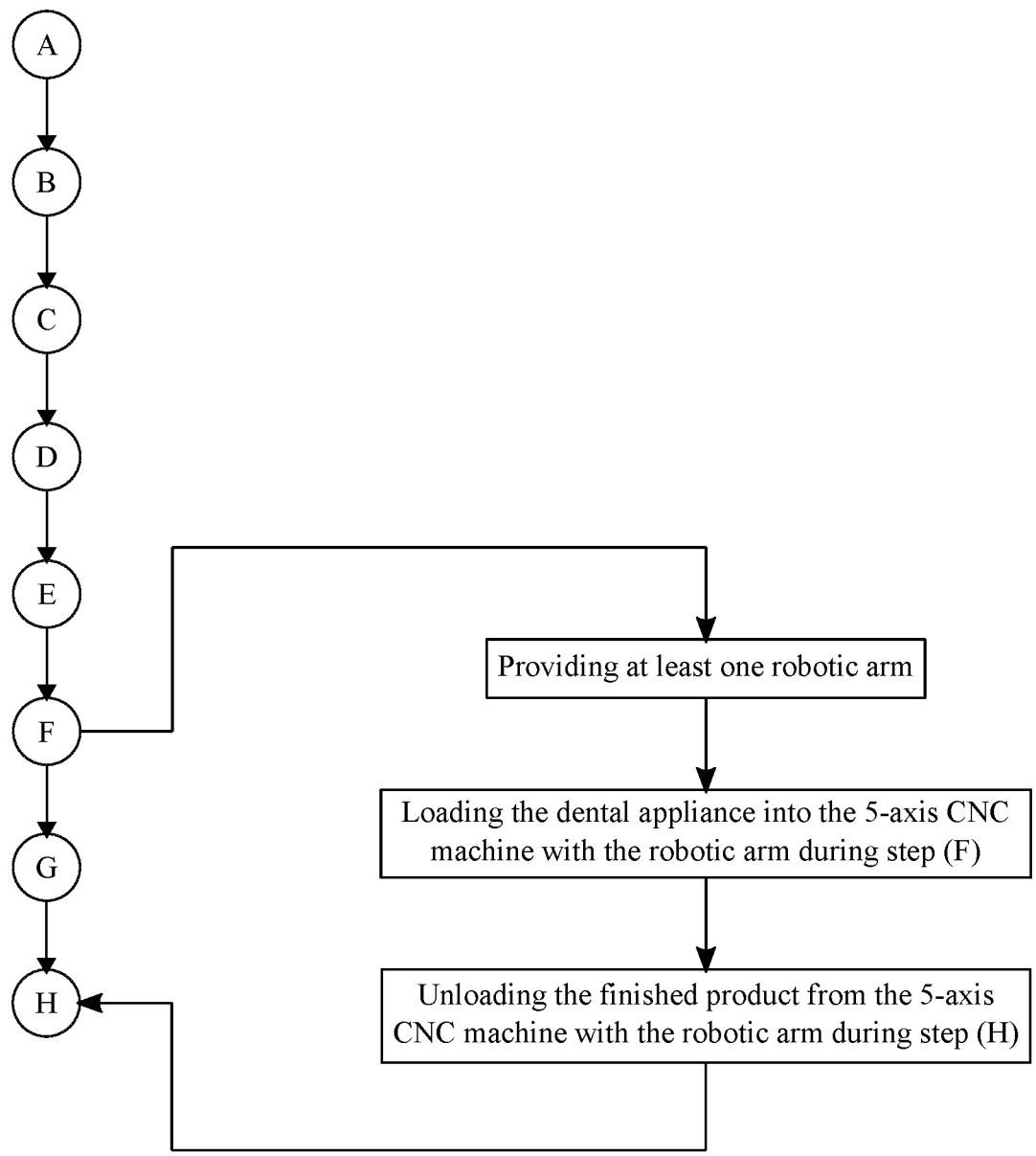
FIG. 12 is a flowchart illustrating a subprocess for automatically loading the dental appliance into the 5-axis CNC machine and automatically unloading the dental appliance out of the 5-axis CNC machine.

As can be seen in FIG. 12, another subprocess for the method of the present invention provides at least one robotic arm. Thus, the dental appliance is loaded into the 5-axis CNC machine with the robotic arm during Step F. Thereafter, the finished product is unloaded from the 5-axis CNC machine with the robotic arm during Step H.

Figure 13:
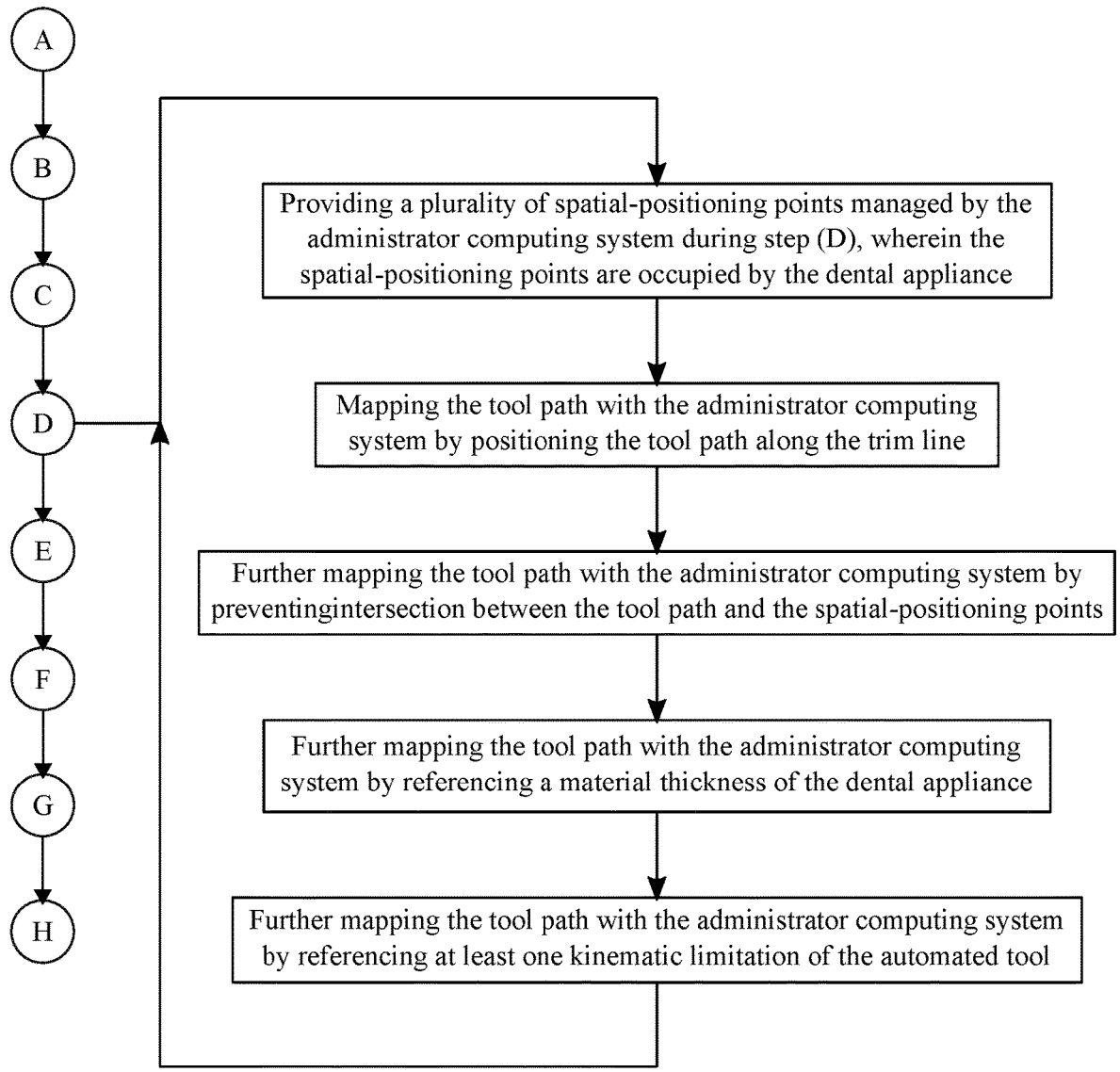
FIG. 13 is a flowchart illustrating a subprocess for mapping the tool path that is primarily based on the trim line.

As can be seen in FIG. 13, another subprocess for the method of the present invention provides a plurality of spatial-positioning points managed by the administrator computing system during Step D. In addition, the spatial-positioning points are occupied by the dental appliance. Thus, the tool path is primarily mapped with the administrator computing system by positioning the tool path along the trim line. The tool path is further mapped with the administrator computing system by preventing intersection between the tool path and the spatial-positioning points. The tool path is further mapped with the administrator computing system by referencing a material thickness of the dental appliance. The tool path is further mapped with the administrator computing system by referencing at least one kinematic limitation of the automated tool.

Figure 14:
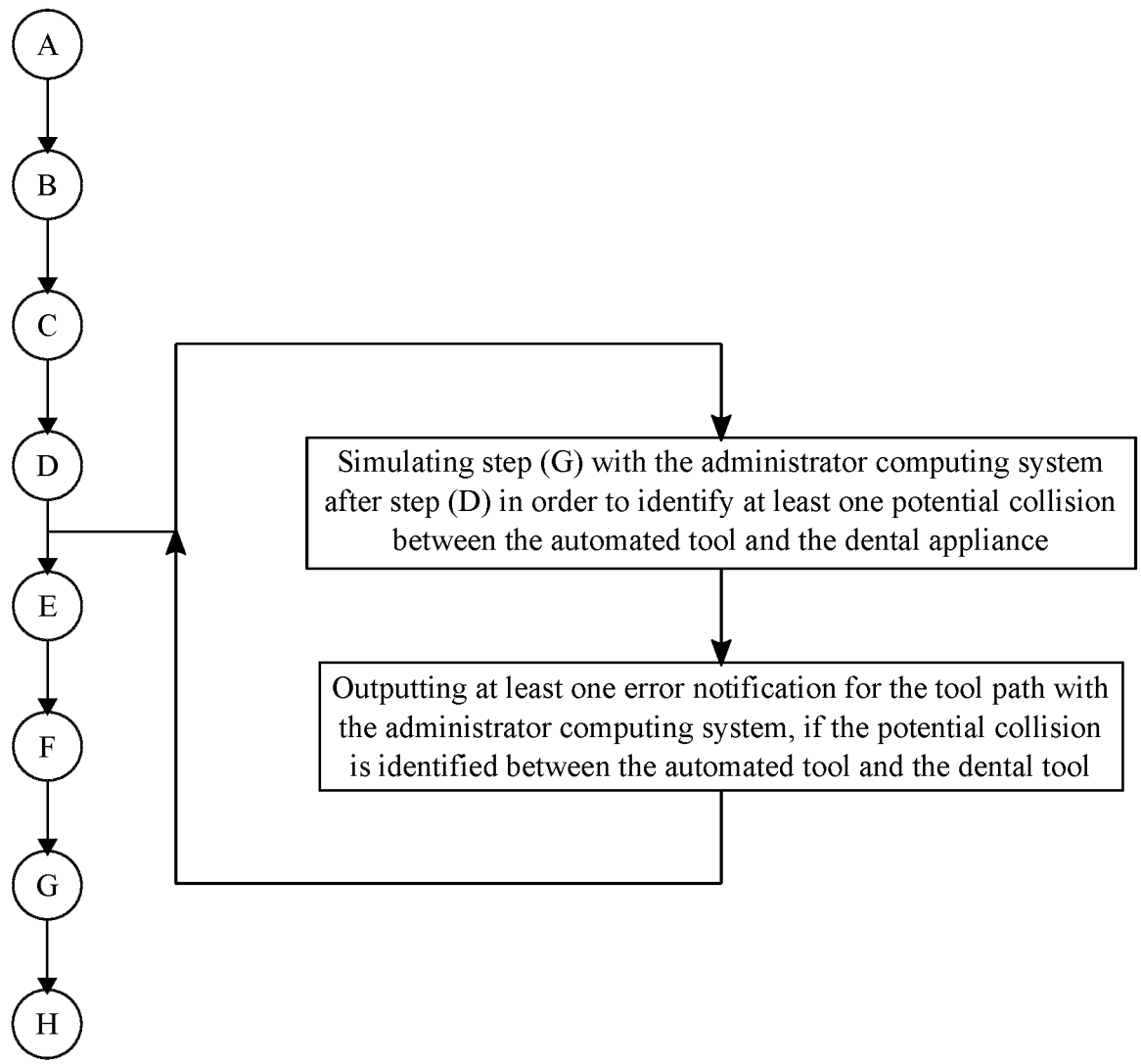
FIG. 14 is a flowchart illustrating a subprocess for simulating the tool path in order to detect any potential collisions in the tool path.

As can be seen in FIG. 14, another subprocess for the method of the present invention begins by simulating Step G with the administrator computing system after Step D in order to identify at least one potential collision between the automated tool and the dental appliance. Consequently, at least one error notification for the tool path is outputted with the administrator computing system, if the potential collision is identified between the automated tool and the dental tool.

Figure 15:
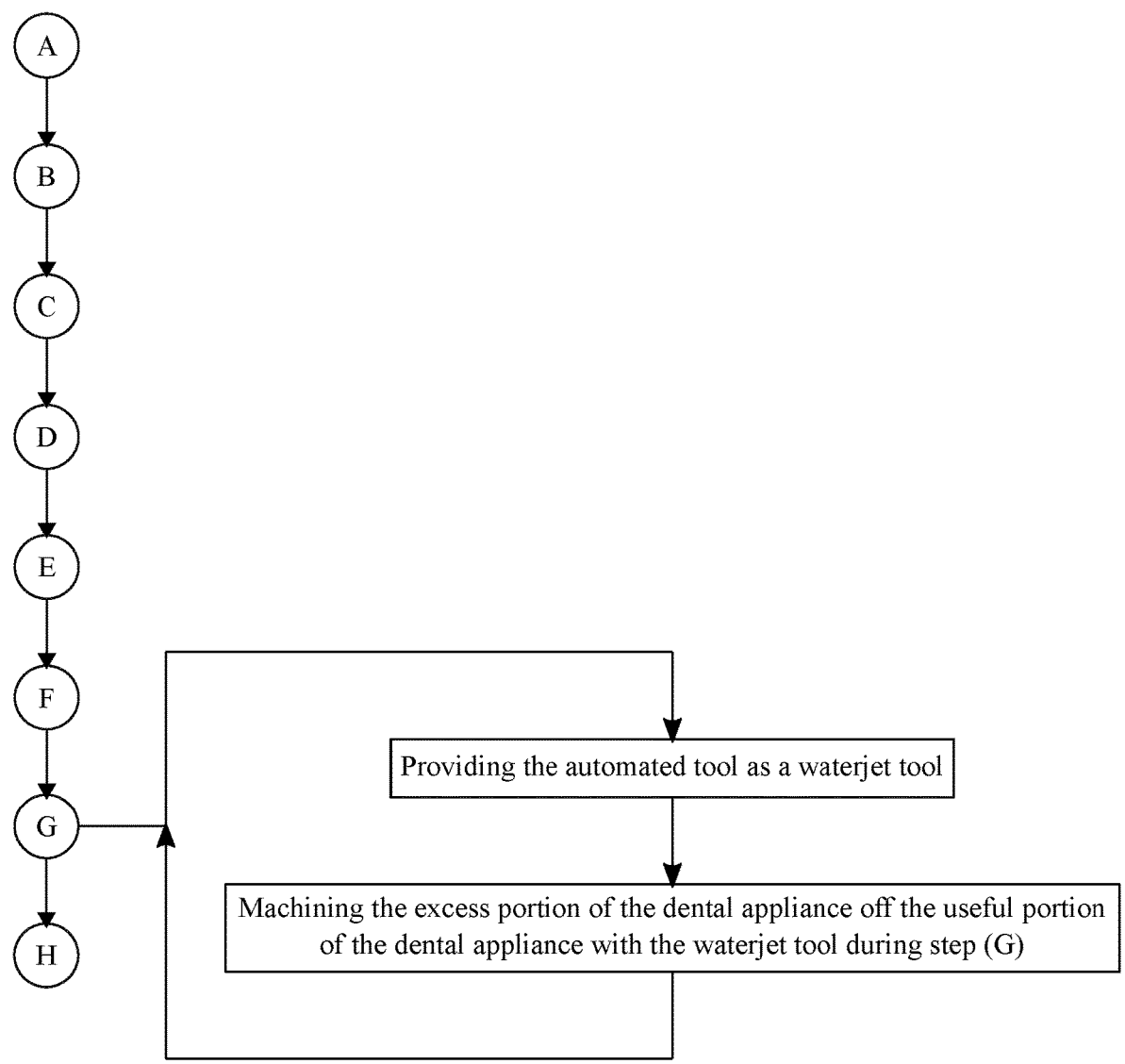
FIG. 15 is a flowchart illustrating a subprocess for using a waterjet tool as the automated tool.

As can be seen in FIG. 15, another subprocess for the method of the present invention provides the automated tool as a waterjet tool. Thus, the excess portion of the dental appliance is machined off the useful portion of the dental appliance with the milling tool during Step G.

Figure 16:
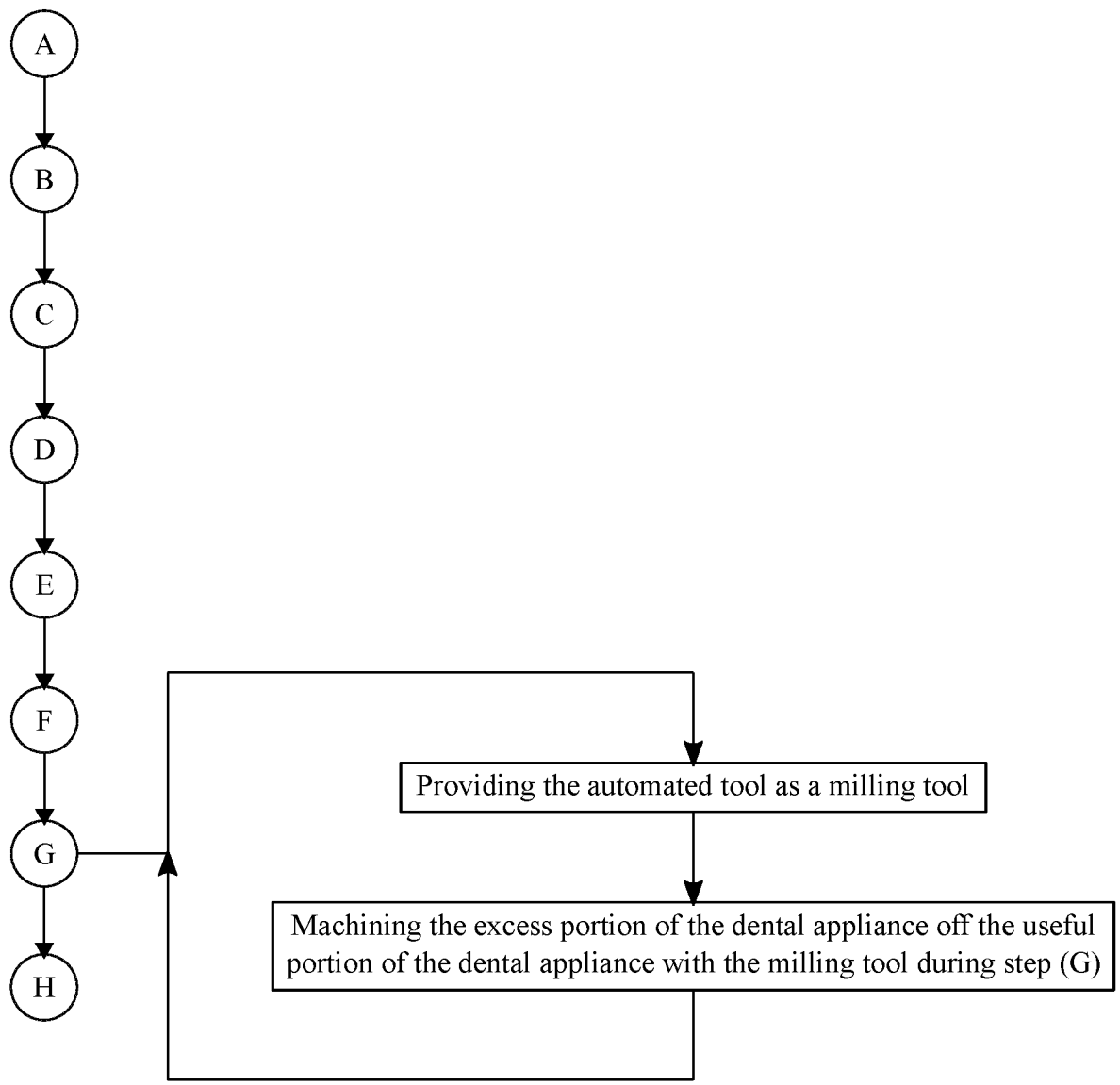
FIG. 16 is a flowchart illustrating a subprocess for using a milling tool as the automated tool.

As can be seen in FIG. 16, another subprocess for the method of the present invention provides the automated tool as a milling tool. Thus, the excess portion of the dental appliance is machined off the useful portion of the dental appliance with the milling tool during Step G.

Figure 17:
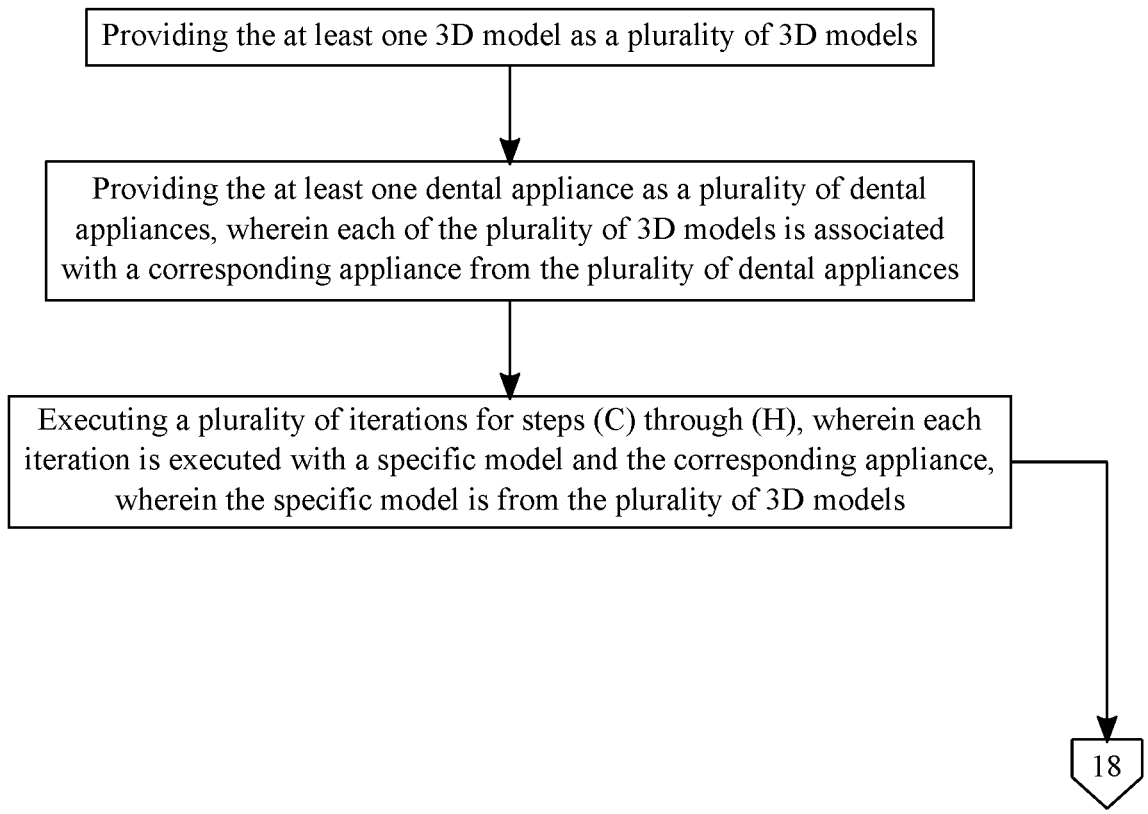
FIG. 17 is a flowchart illustrating a larger process for reiterating the overall process to remove the excess material from a plurality of dental appliances.
Figure 18:
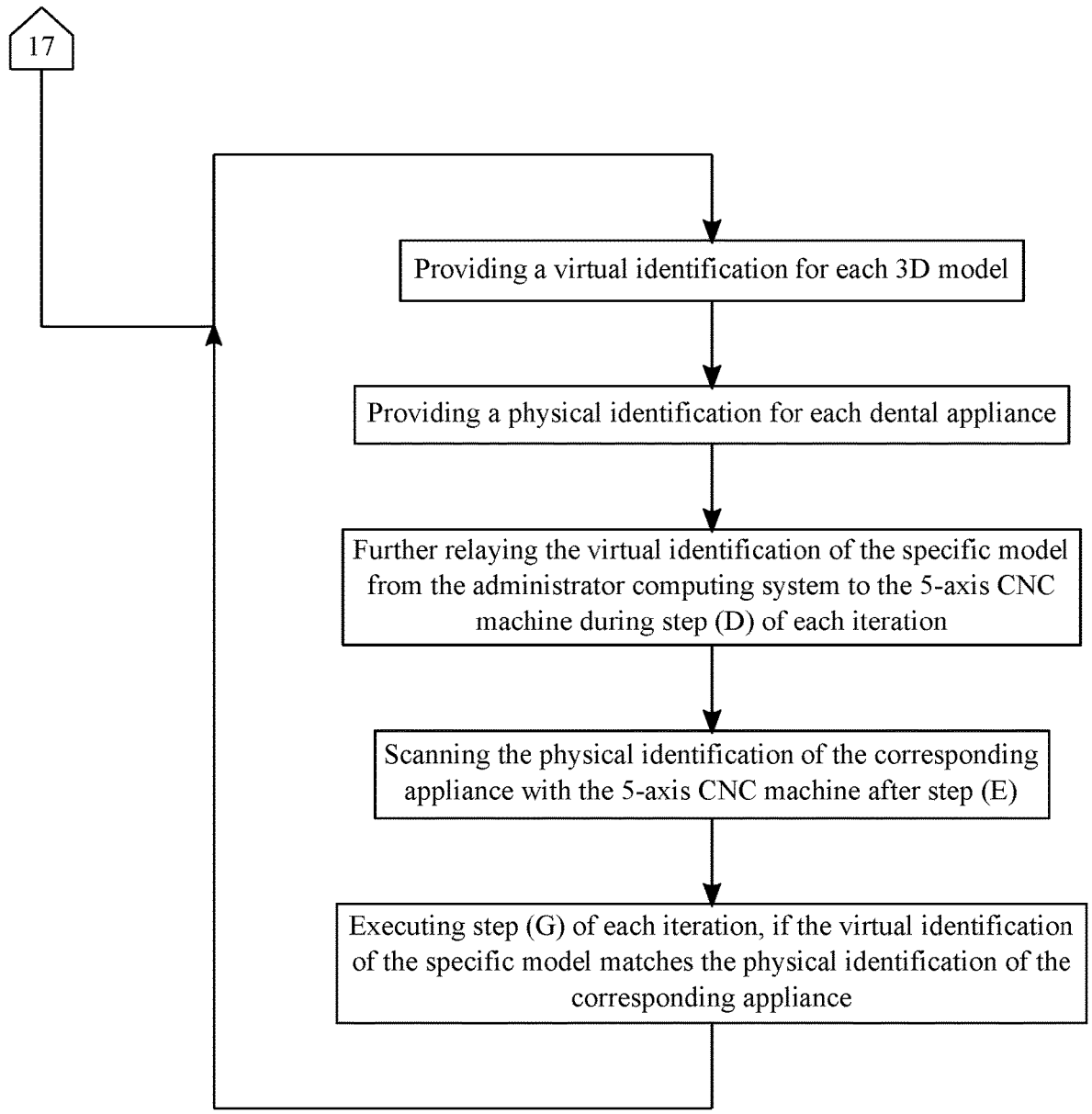
FIG. 18 is a flowchart illustrating a subprocess for verifying that the correct dental appliance was loaded into the 5-axis CNC machine.

As can be seen in FIG. 17, a larger process for the method of the present invention provides the at least one 3D model as a plurality of 3D models and the at least one dental appliance as a plurality of dental appliances. Moreover, each of the plurality of 3D models is associated with a corresponding appliance from the plurality of dental appliances. This larger process is executed as a plurality of iterations for Steps C through H. Thus, each iteration is executed with a specific model and the corresponding appliance, and the specific model is from the plurality of 3D models. More specifically, this larger process can provide a virtual identification for each 3D model and a physical identification for each dental appliance, which is shown in FIG. 18. As a result, the virtual identification of the specific model can be further relayed from the administrator computing system to the 5-axis CNC machine during Step E of each iteration. As another result, the physical identification of the corresponding appliance can be scanned with the 5-axis CNC machine after Step E. Finally, Step G of each iteration can be executed by the 5-axis CNC machine, if the virtual identification of the specific model matches the physical identification of the corresponding appliance.

Figure 19:
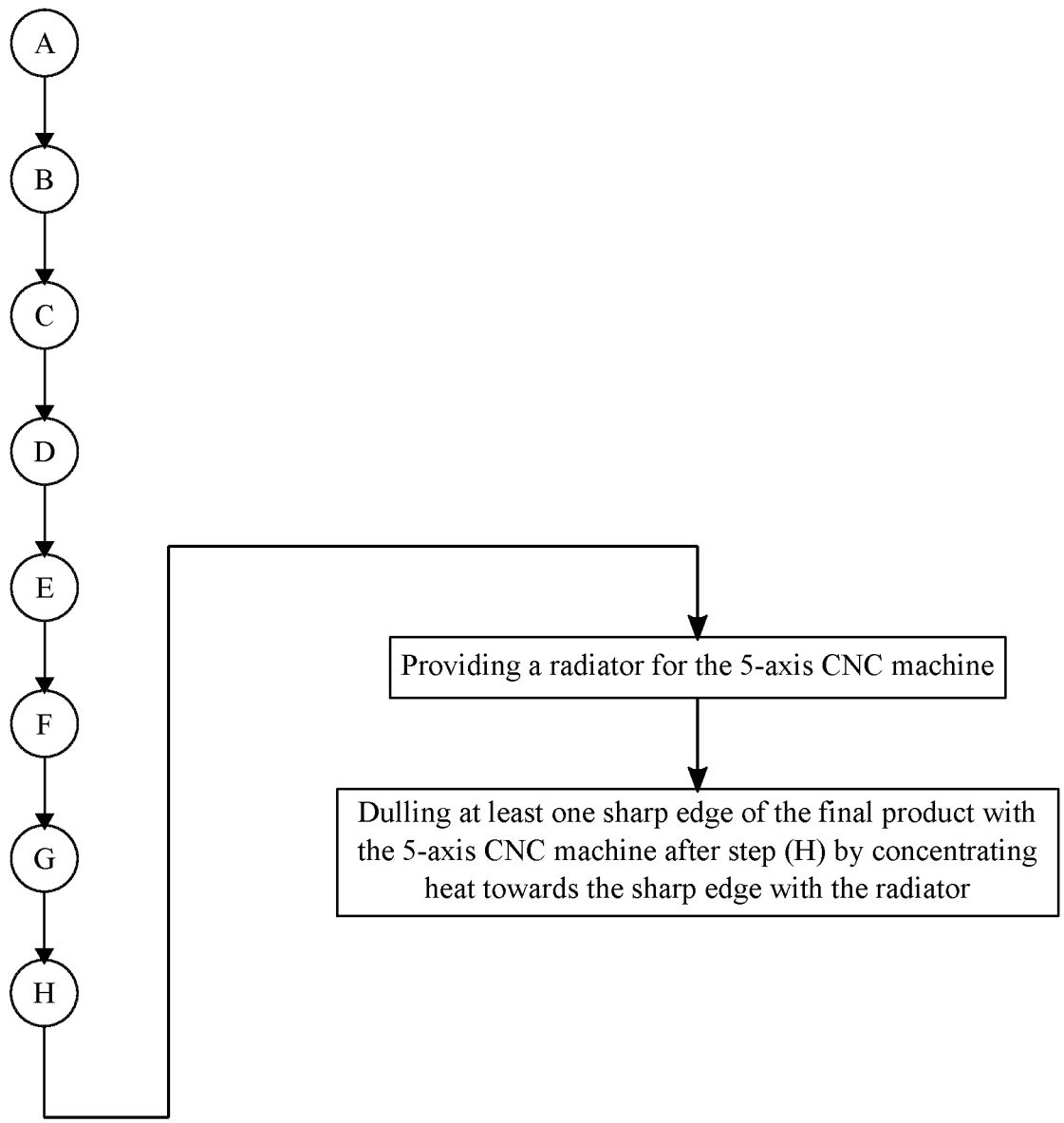
FIG. 19 is a flowchart illustrating a subprocess for dulling sharp edges of the final product.

As can be seen in FIG. 19, another subprocess for the method of the present invention provides a radiator for the 5-axis CNC machine. Thus, at least one sharp edge of the final product is dulled with the 5-axis CNC machine after Step H by concentrating heat towards the sharp edge with the radiator. An alternative to this subprocess is to dull the sharp edges of the final product with a technique known as tumbling.

SUPPLEMENTAL DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one" but does not exclude a plurality unless the contextual use dictates otherwise. When used herein to join a list of items, "or" denotes "at least one of the items" but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods to facilitate the removal of excess material from a dental appliance, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g., username, password, passphrase, PIN, secret question, secret answer, etc.) and/or possession of a machine-readable secret data (e.g., encryption key, decryption key, bar codes, etc.) and/or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

As an overview, the present disclosure describes systems and methods to facilitate the removal of excess material from a dental appliance. Further, the present disclosure may include a method by which the excess material remaining on a thermoformed aligner is trimmed to comply with patient anatomy. Further, the disclosed method utilizes a 5-axis CNC machine to trim the excess material and using a milling or waterjet machining method of material removal.

There have been developed methods of correcting the position of misaligned teeth using dental trays fabricated in a manner that a given tray will itself exert a force upon the misaligned teeth to cause movement. Often these alignment trays are fabricated from a clear plastic material and are provided in a series such that each succeeding tray moves the teeth more or differently than the previous tray, in an incremental fashion so as to affect the prescribed treatment plan. Each tray, therefore, will move certain teeth from a starting or "before" position to a selected ending or "after" position. The "after" position is based solely upon the nature of the immediately previous "before" position. Further, the shape and force exerted by each successive aligner tray in the treatment process of the conventional system is based only upon the nature of where the previous tray left off in the moving of the teeth. There may be some target goal in mind as to where a dental professional wants to ultimately move the teeth, but until the very end of the patient's treatment procedure, this final position and the initial starting position do not affect the incremental or intermediate treatment steps.

A 3D CAD treatment planning software may be used to output a 3D CAD model of the lower and upper mandible for each phase of the treatment which includes initial position, final position and any number of intermediary teeth required specifically for the patient.

Further, the disclosed method may involve the identification of patient cases and all associated 3D CAD models. Identification methods can include the use of bar code, RFID code or other methods to identify the 3D CAD model and associated trim line for each aligner in the patient treatment plan.

Further, the disclosed method may allow for use of the pre-defined aligner trim line or in cases where the trim line is not defined, it can optionally be generated by special application software available within a system of the 5-axis CNC machine.

Further, the system then may generate the 5-axis CNC machining code (toolpath) necessary to drive a milling tool or waterjet head along the trim line, thereby removing the excess material that existed as part of the thermoforming operation. The 5-axis toolpath contains X, Y, and Z linear positional points as well as A and B rotational angles to assure optimum machining angles and adherence to the 5-axis CNC machines linear and rotational limits.

In addition to optionally generating the required trim line for the aligner and associated CNC machining code, the system also may verify the calculated CNC machine toolpath for potential collisions between any combination of machine components, model/aligner to be trimmed, cutting tool/waterjet assembly and fixture. The output motion commands also include determination and setting of appropriate spindle speeds, motion feed rates for linear and rotary motion as well as instructions for control of the waterjet machining parameters.

A special vacuum fixture is created to secure the model/aligner within the 5-axis CNC machine and is automatically operated with the system. This fixture has specific "artifacts" to accurately locate the model/aligner in the 5-axis CNC machine. Additionally, each 3D printed model may include identical "artifacts" in terms of size and position, to assure proper location on the machine vacuum fixture.

A System Operational Workflow can be either semi-automatic or automatic. All associated CAD models and trim line data files are identified and retrieved from a center depository/server in keeping with end-users' IT and network environment and infrastructure. An operator then loads the first model/aligner onto the machine fixture (utilizing alignment artifacts), manually starts the process by utilizing the machines cycle-start function. The associated toolpath is either calculated and verified in real-time or is retrieved from a server. The machine then machines the aligner, trimming the excess plastic. Once completed the machine stops allowing the operator to open the machine access door, remove the completed and trimmed model/aligner, replaces it with the next "model"/aligner in the case, closes the machine door, then starts the machine cycle-start function, wherein the vacuum system starts to secure the model/aligner, toolpath transferred, generated and verified run as with the first mode/aligner. This process is repeated for all models/aligners in the patients' plan.

Further, the system may also accommodate the use of a robot and a rail system to automatically load and unload the model/aligner and transfer it to a 5-axis CNC machining cell, thereby eliminating the need for an operator to start and stop a cycle.

Figure 20:
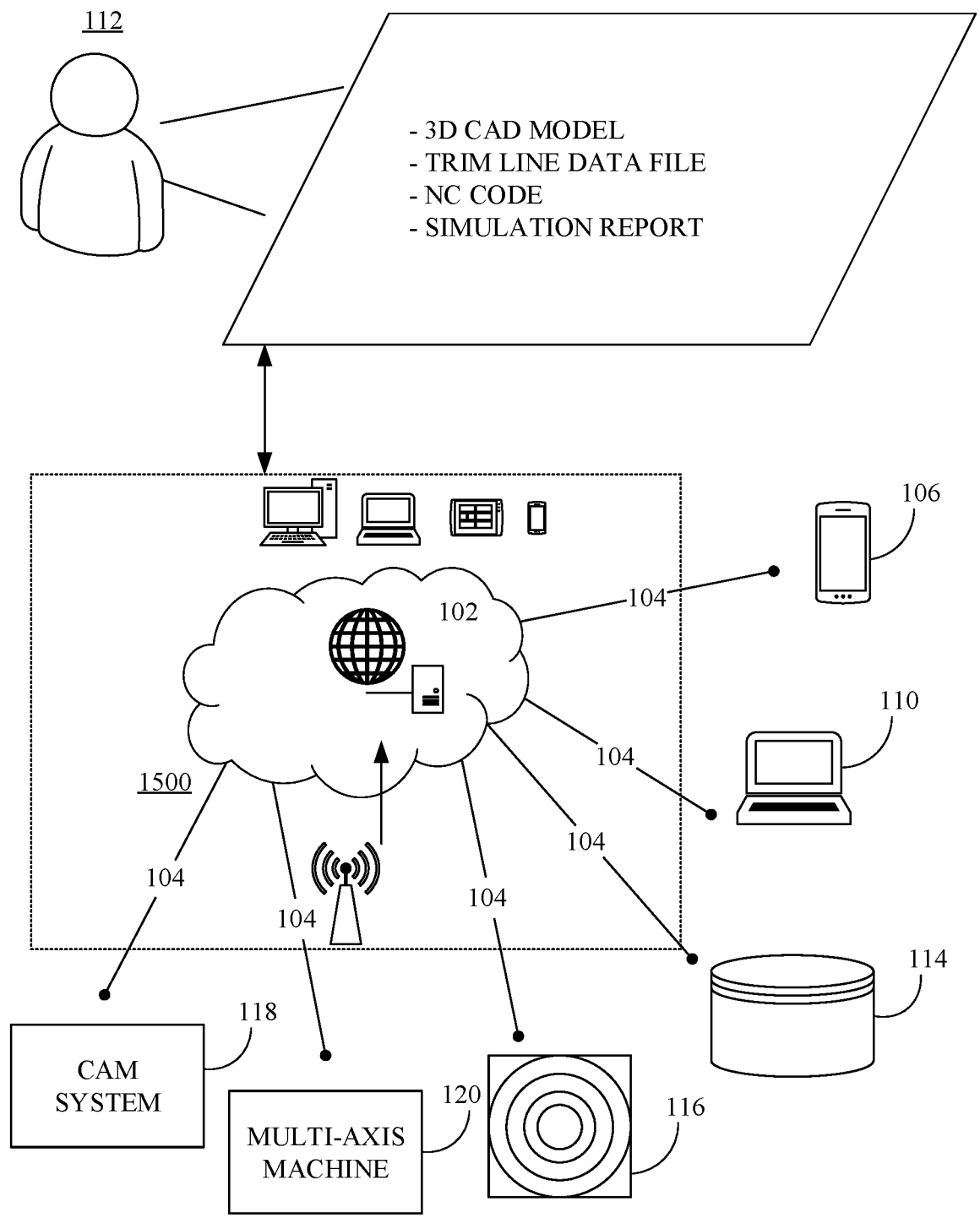
FIG. 20 is an illustration of an online platform consistent with various embodiments of the present disclosure.

FIG. 20 is an illustration of an online platform 100 consistent with various embodiments of the present disclosure. By way of non-limiting example, the online platform 100 to facilitate the removal of excess material from a dental appliance may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, sensors 116, a CAM system 118, and a multi-axis machine 120 (such as a 5-axis CNC machine) over a communication network 104, such as, but not limited to, the Internet. Further, users of the online platform 100 may include relevant parties such as, but not limited to, end-users and administrators. Accordingly, in some instances, electronic devices operated by the one or more relevant parties may be in communication with the online platform 100.

A user 112, such as the one or more relevant parties, may access the online platform 100 through a web-based software application or browser. The web-based software application may be embodied as, for example, but not be limited to, a website, a web application, a desktop application, and a mobile application compatible with a computing device 1500.

Figure 21:
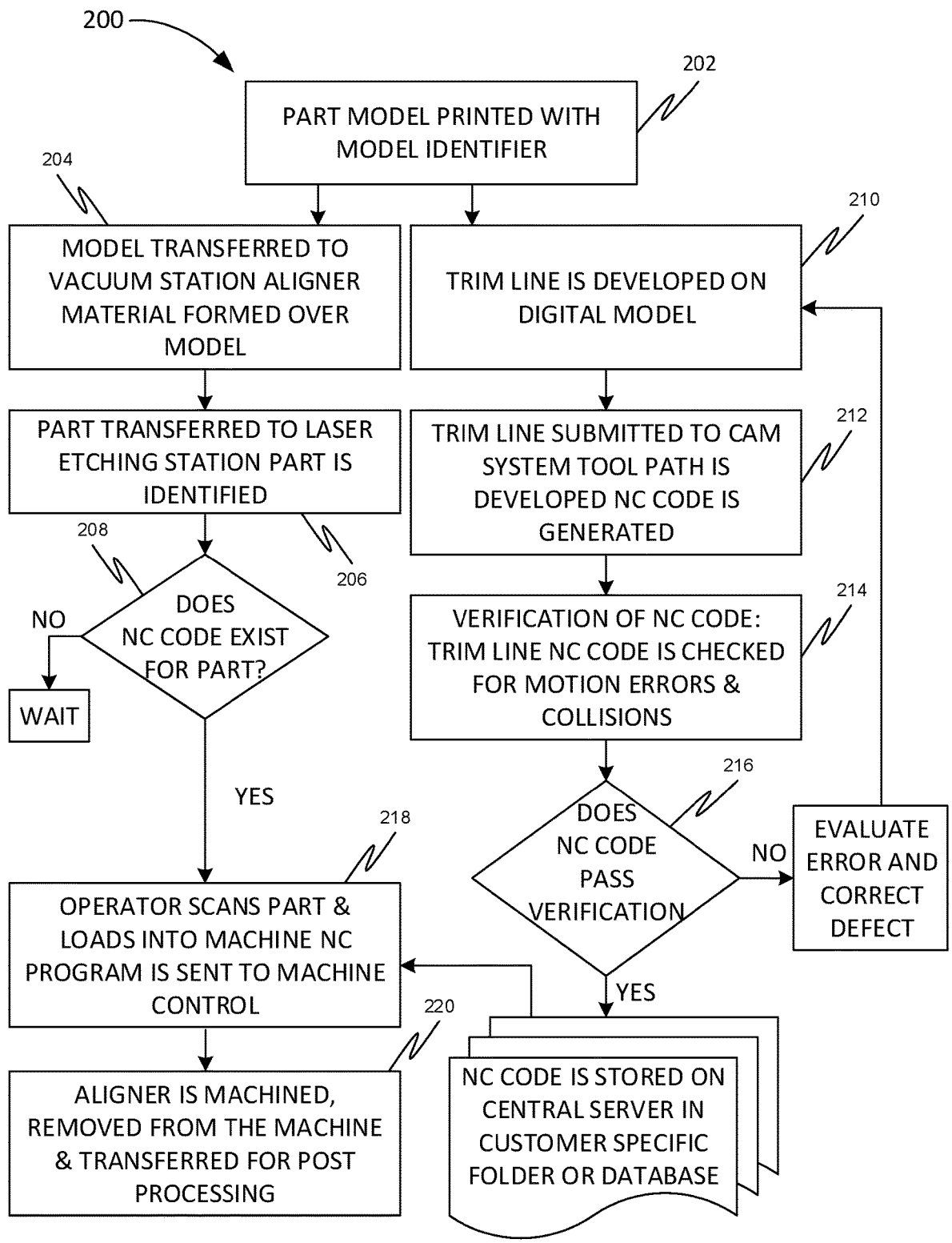
FIG. 21 is a flowchart of a method to facilitate the removal of excess material from a dental appliance, in accordance with some embodiments.

FIG. 21 is a flowchart of a method 200 to facilitate the removal of excess material from a dental appliance, in accordance with some embodiments. Accordingly, at 202, the method 200 may include a step of printing a part model with a model identifier. Further, the part model may include a physical model that may be produced by utilizing a 3D printer. Further, the 3D printer may utilize a variety of 3D printing techniques and technologies.

Further, at 204, the method 200 may include a step of transferring the part model to a vacuum station, and an aligner material may be formed over the part model. Further, the vacuum station may include a vacuum forming machine. Further, the aligner material may include an aligner tray. Further, the aligner tray may be created by vacuum thermoforming over the part model using a plastic thermoforming sheet and the vacuum forming machine. Further, the aligner tray may be removed from the part model.

Further, at 206, the method 200 may include a step of transferring the aligner tray to a laser etching station. Further, the laser etching station may include a laser etching machine. Further, the aligner tray may be etched by an etching process.

Further, at 208, the method 200 may include a step of identifying whether an NC code exists for the aligner tray. Further, if the NC code does not exist for the aligner tray, then the NC code is not processed further. Further, if the NC code exists for the aligner tray, then the NC code may be sent to a 5-axis CNC machine.

Further, at 210, the method 200 may include a step of developing a trim line on a digital model. Further, the trim line may be a line along which a trimming process of removal of excess plastic, that existed as a part of the thermoforming operation is performed. Further, the digital model may be a computer geometric model that may be a mathematical representation of an object's geometry. Further, the method 200 may include identification methods for a patient case and all associated 3D CAD models. Further, the identification methods may include the use of a bar code, an RFID code or other methods to identify the 3D CAD model and the trim line for each aligner tray in a patient treatment plan. Further, the trim line may be associated with a trim line data file. Further, in some embodiments, the method 200 may allow for use of a pre-defined aligner trim line. Further, the pre-defined aligner trim line may be optionally generated by an application software available within the CAM system.

Further, at 212, the method 200 may include a step of submitting the trim line to the CAM system, wherein a toolpath may be developed and an NC code may be generated for machining tools. Further, the CAM system then may generate a 5-axis CNC machining code necessary to drive a milling tool or a waterjet head along the trim line. Further, the 5-axis CNC machining code may allow a 5-axis toolpath for the milling tool. Further, the 5-axis toolpath may include X, Y, and Z linear positional points as well as A and B rotational angles to assure optimum machining angles and adherence to the 5-axis CNC machine's linear and rotational limits.

Further, at 214, the method 200 may include a step of verifying the NC code. Further, the verification of the NC code may be accomplished in real-time during the trimming process. Further, the NC code associated with the trim line may be checked for motion errors and collisions. Further, the toolpath may be verified for potential collisions between any combination of machine components, cutting tool/waterjet assembly, the aligner tray to be trimmed, and fixture of the 5-axis CNC machine. Further, the method 200 may include determination and setting of appropriate spindle speeds, motion feed rates for linear and rotary motion as well as instructions for controlling of waterjet machining parameters.

Further, at 216, the method 200 may include a step of identifying whether the NC code passes the verification. Further, if the NC code does not pass the verification, the NC code may be evaluated for error detection and a correct NC code may be determined. Further, step 210 of the method 200 of developing the trim line may be repeated. Further, if the NC code passes the verification, the NC code is stored on a server in a customer-specific folder or a database. Further, the NC code may be sent to the 5-axis CNC machine.

Further, at 218, the method 200 may include a step of scanning the aligner tray and loading it into the 5-axis CNC machine. Further, an operator may scan and load the aligner tray onto a vacuum fixture of the 5-axis CNC machine. Further, the vacuum fixture may secure the aligner tray within the 5-axis CNC machine. Further, the vacuum fixture may be automatically operated by the CAM system.

Further, at 220, the method 200 may include a step of machining the aligner tray. Further, the 3D CAD model and trim line data file are identified and retrieved from a center depository/server. Further, the operator may manually start the process of trimming by utilizing a machine cycle-start function. Further, the machine cycle-start function may be a control button used to initiate the program. Further, the 5-axis CNC machine may then trim the excess plastic from the aligner tray along the trim line, thereby removing the excess material that existed as a part of the thermoforming operation. Once the trimming process is completed, the machine may stop, thereby allowing the operator to open the 5-axis CNC machine and access a machine door. Further, the aligner tray may be removed and may be replaced with the next aligner tray. Further, the operator may close the machine door and then start the machine cycle-start function, wherein the vacuum fixture may start to secure the aligner tray. Further, a verification run may be processed for the toolpath with the aligner tray. This process is repeated for all aligner trays. Further, the aligner tray may be transferred for post-processing.

Further, in some embodiments, the system may accommodate a robot and a rail system to automatically load and unload the aligner tray and transfer it to a 5-axis CNC machining cell, thereby eliminating the need for an operator to start and stop a cycle.

Figure 22:
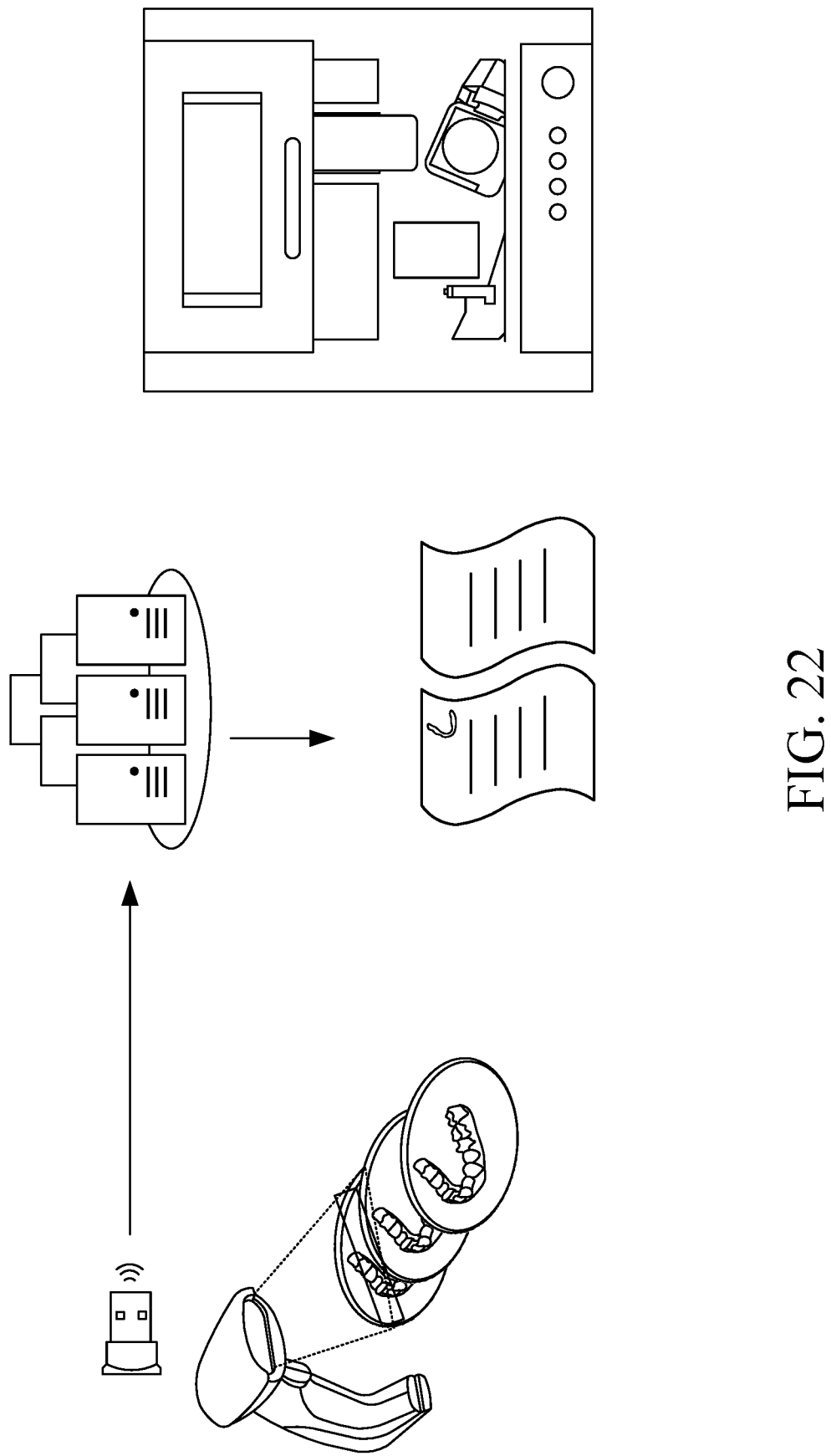
FIG. 22 illustrates a semi-automated aligner trim process, in accordance with some embodiments.

FIG. 22 illustrates a semi-automated aligner trim process, in accordance with some embodiments. Further, the semi-automated aligner trim process may include scanning of bar code associated with a 3D CAD model. Further, data associated with bar code may be stored in data centers. Further, the data may be retrieved by a 5-axis CNC machine operated by an operator, who manually places the aligner tray for the trimming process. Further, the operator may initiate the machine cycle-start function in order to start the trimming process.

Figure 23:
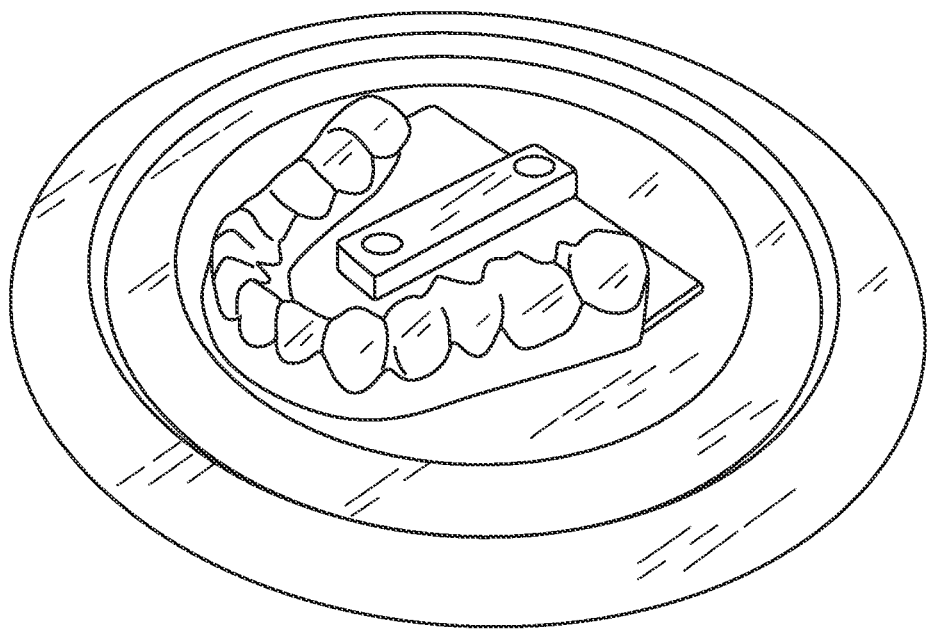
FIG. 23 is a side top perspective view of a thermoformed plastic aligner, in accordance with some embodiments.

FIG. 23 is a side top perspective view of a thermoformed plastic aligner, in accordance with some embodiments.

Figure 24:
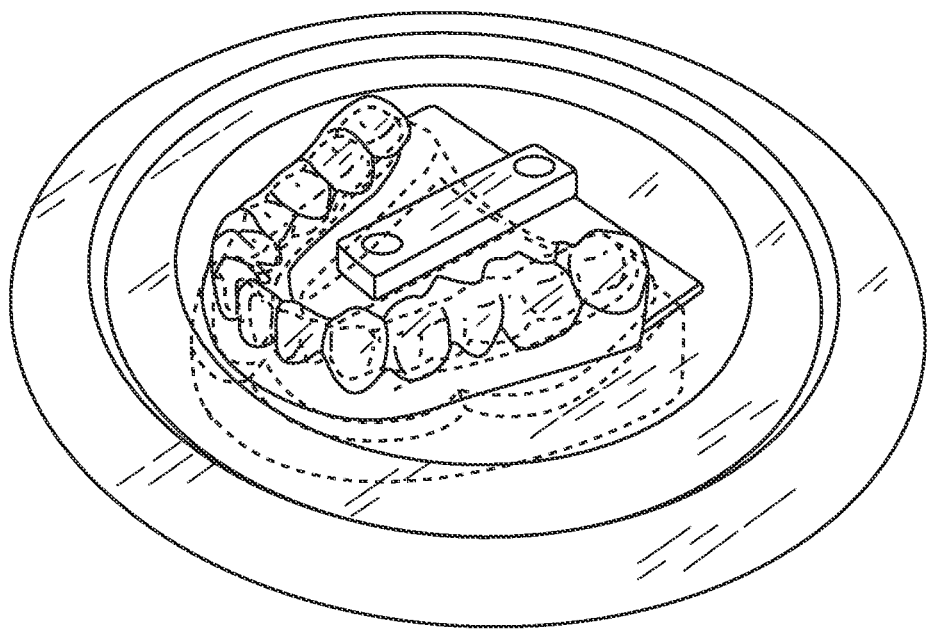
FIG. 24 is a side top perspective view of a thermoformed plastic aligner on a model, in accordance with some embodiments.

FIG. 24 is a side top perspective view of a thermoformed plastic aligner on a model, in accordance with some embodiments.

Figure 25:
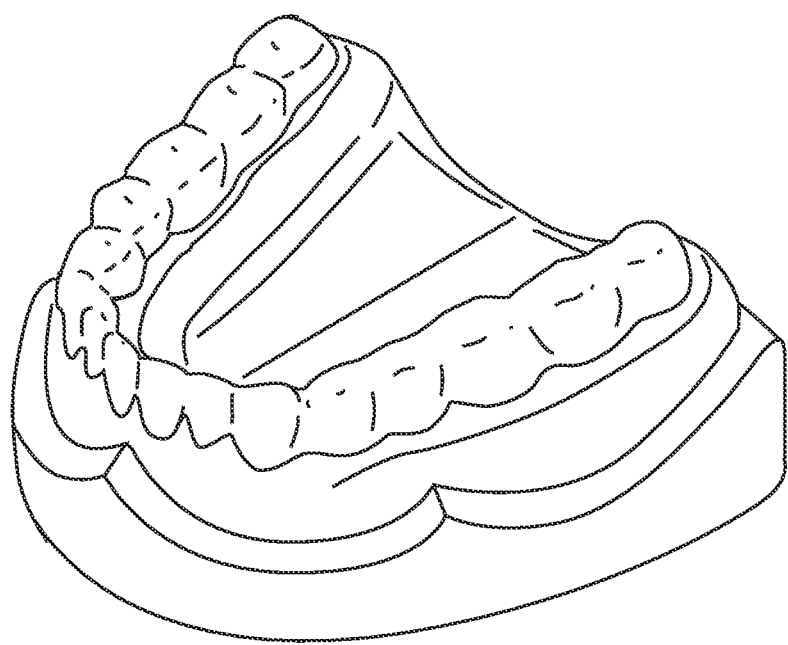
FIG. 25 is a side top perspective view of a 3D CAD model showing a trim line on the 3D CAD model, in accordance with some embodiments.

FIG. 25 is a side top perspective view of a 3D CAD model showing a trim line on the 3D CAD model, in accordance with some embodiments.

Figure 26:
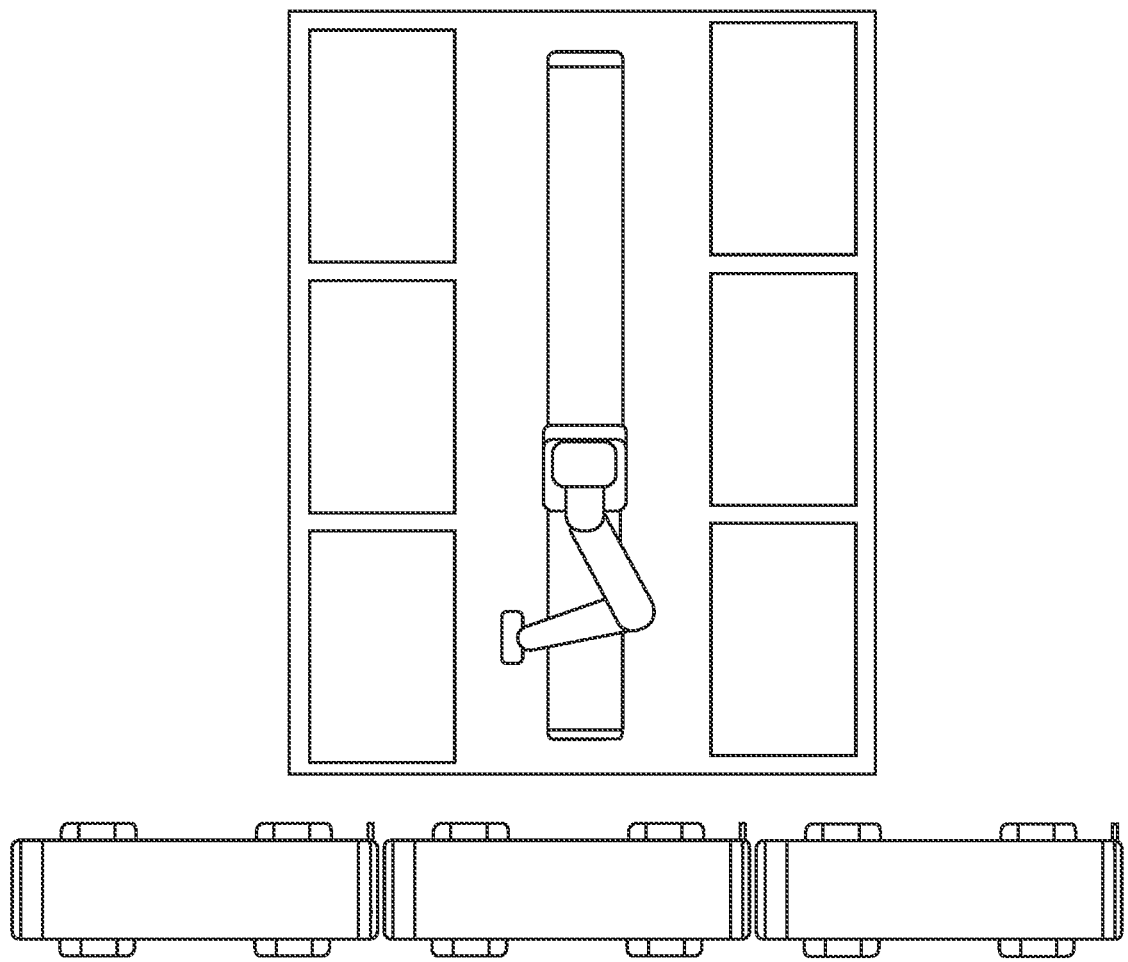
FIG. 26 is a top view of a machining cell serviced by a robot, in accordance with some embodiments.

FIG. 26 is a top view of a machining cell serviced by a robot, in accordance with some embodiments.

Figure 27:
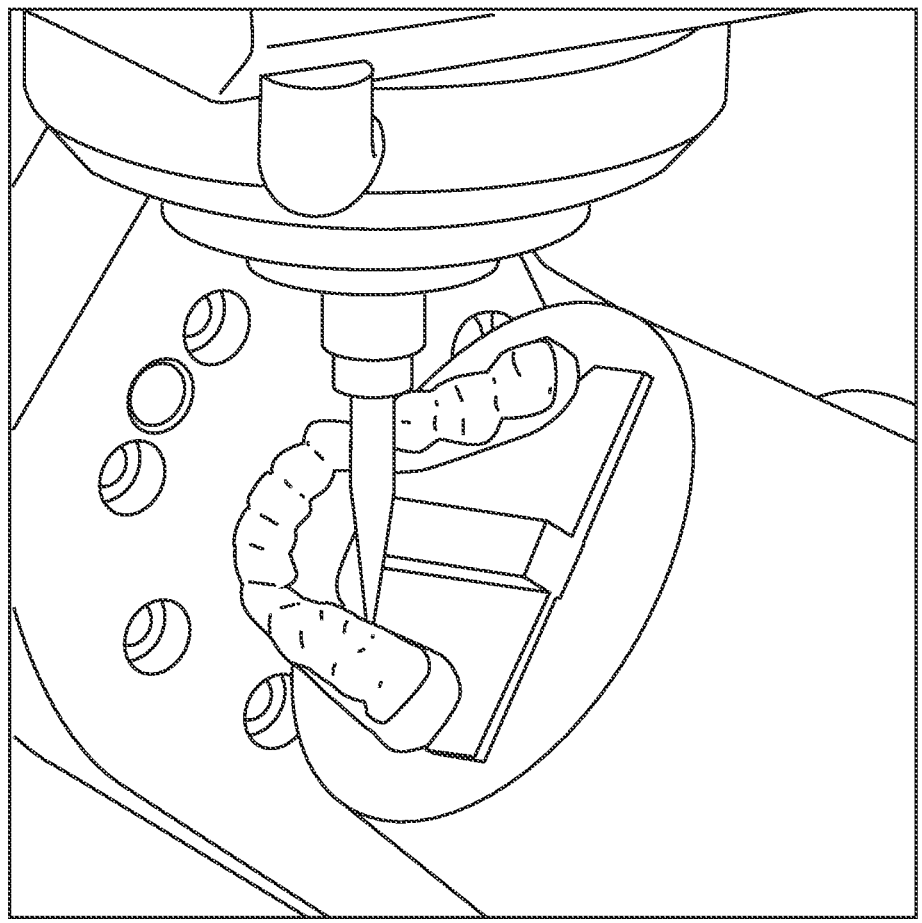
FIG. 27 is a rear top perspective view of an aligner tray showing a simulation of machining process, in accordance with some embodiments.

FIG. 27 is a rear top perspective view of an aligner tray showing a simulation of machining process, in accordance with some embodiments.

Figure 28:
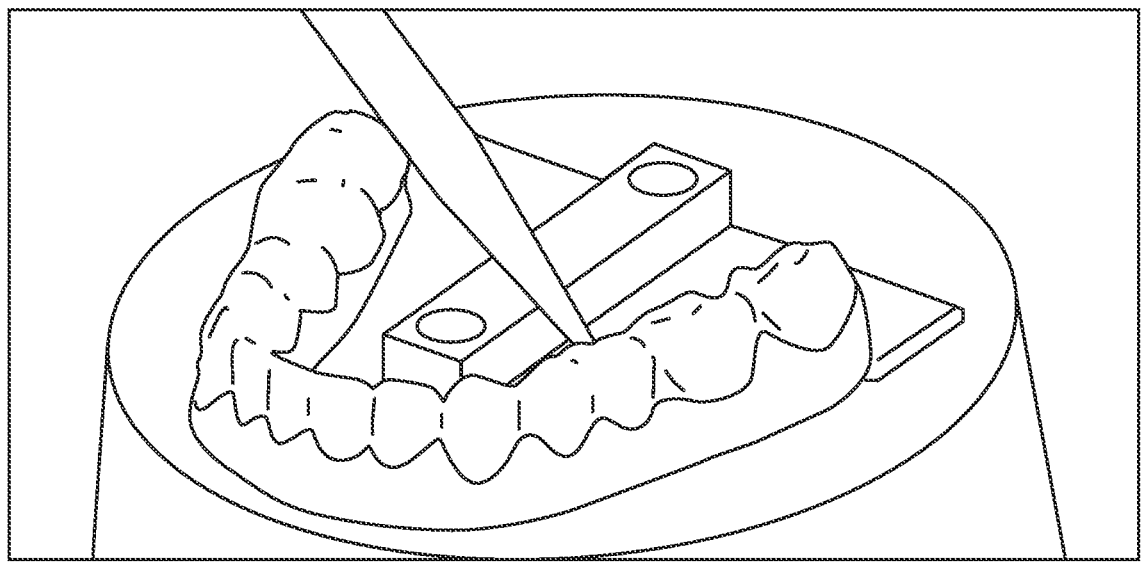
FIG. 28 is a front top perspective view of an aligner tray showing a simulation of machining process, in accordance with some embodiments.

FIG. 28 is a front top perspective view of an aligner tray showing a simulation of machining process, in accordance with some embodiments.

Figure 29:
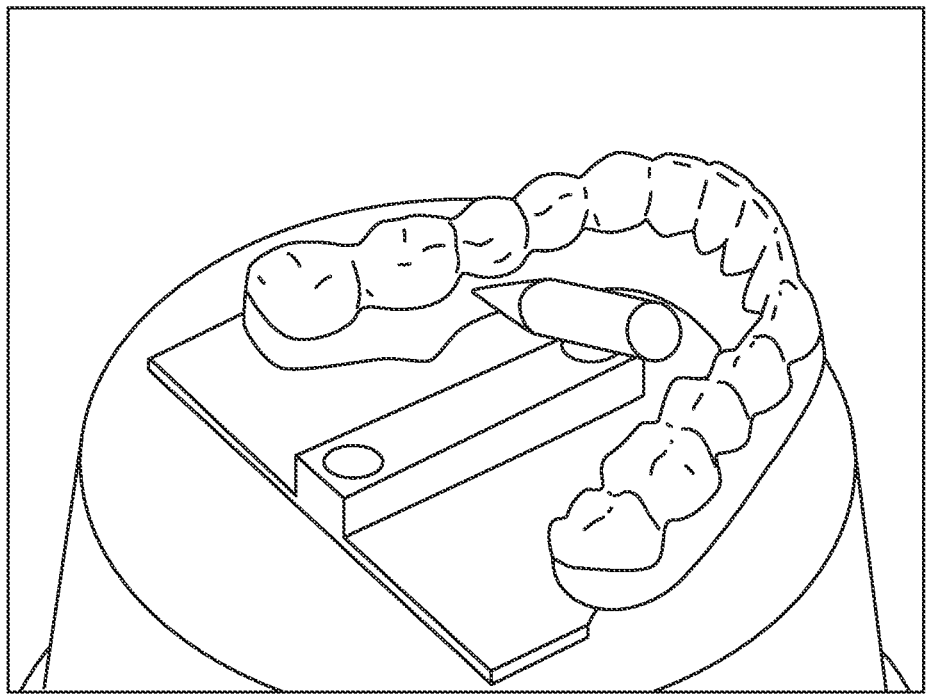
FIG. 29 is a rear top perspective view of an aligner tray showing a simulation of machining process, in accordance with some embodiments.

FIG. 29 is a rear top perspective view of an aligner tray showing a simulation of machining process, in accordance with some embodiments.

Figure 30:
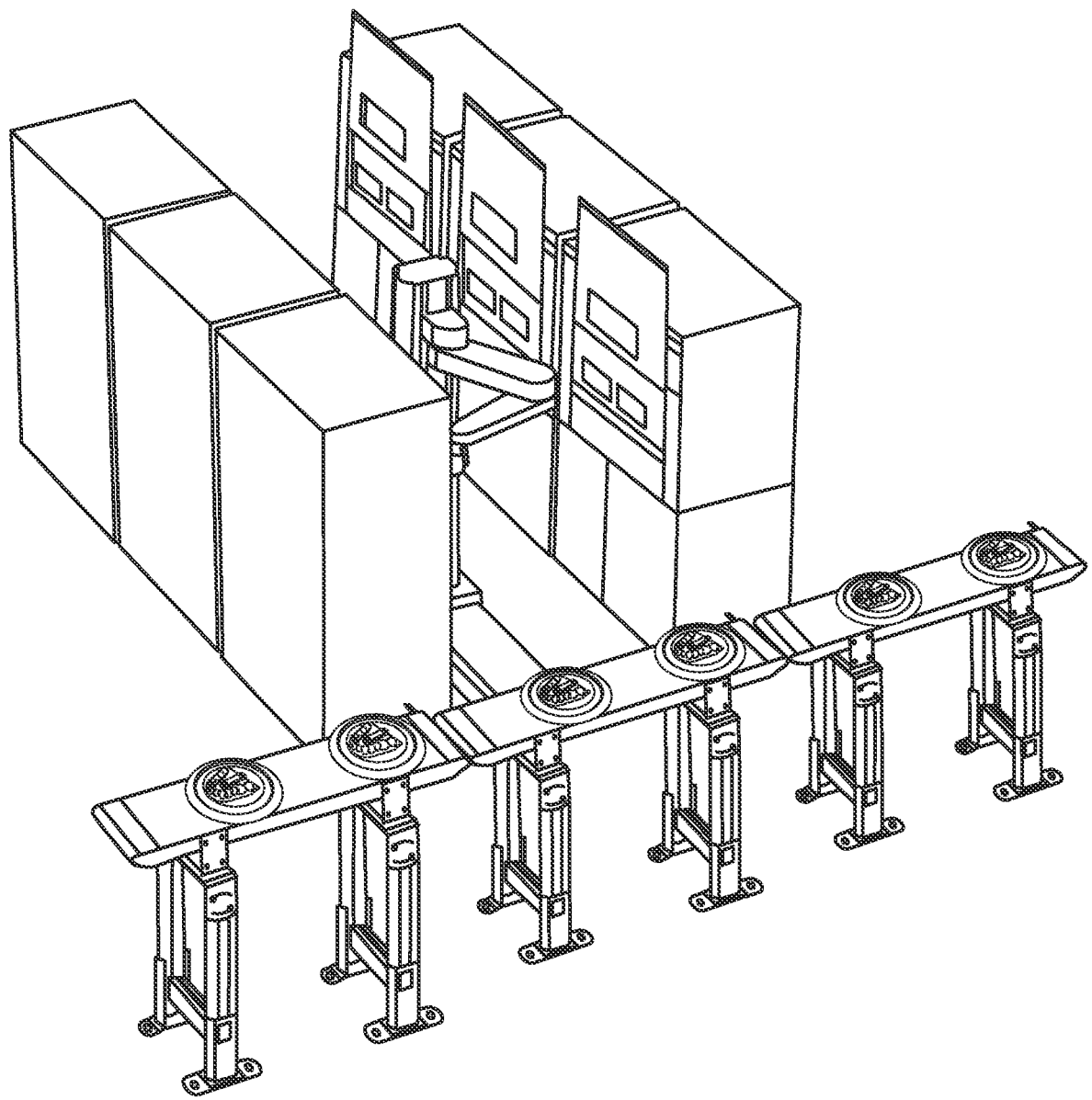
FIG. 30 is a top perspective view of six 5-axis CNC Machining Centers served by a robot, in accordance with some embodiments.

FIG. 30 is a top perspective view of six 5-axis CNC Machining Centers served by a robot, in accordance with some embodiments. Further, the robot may manage multiple machines or move appliance models from one operation to another from a thermo-former to the machine or from the machine to a deburring station.

Figure 31:
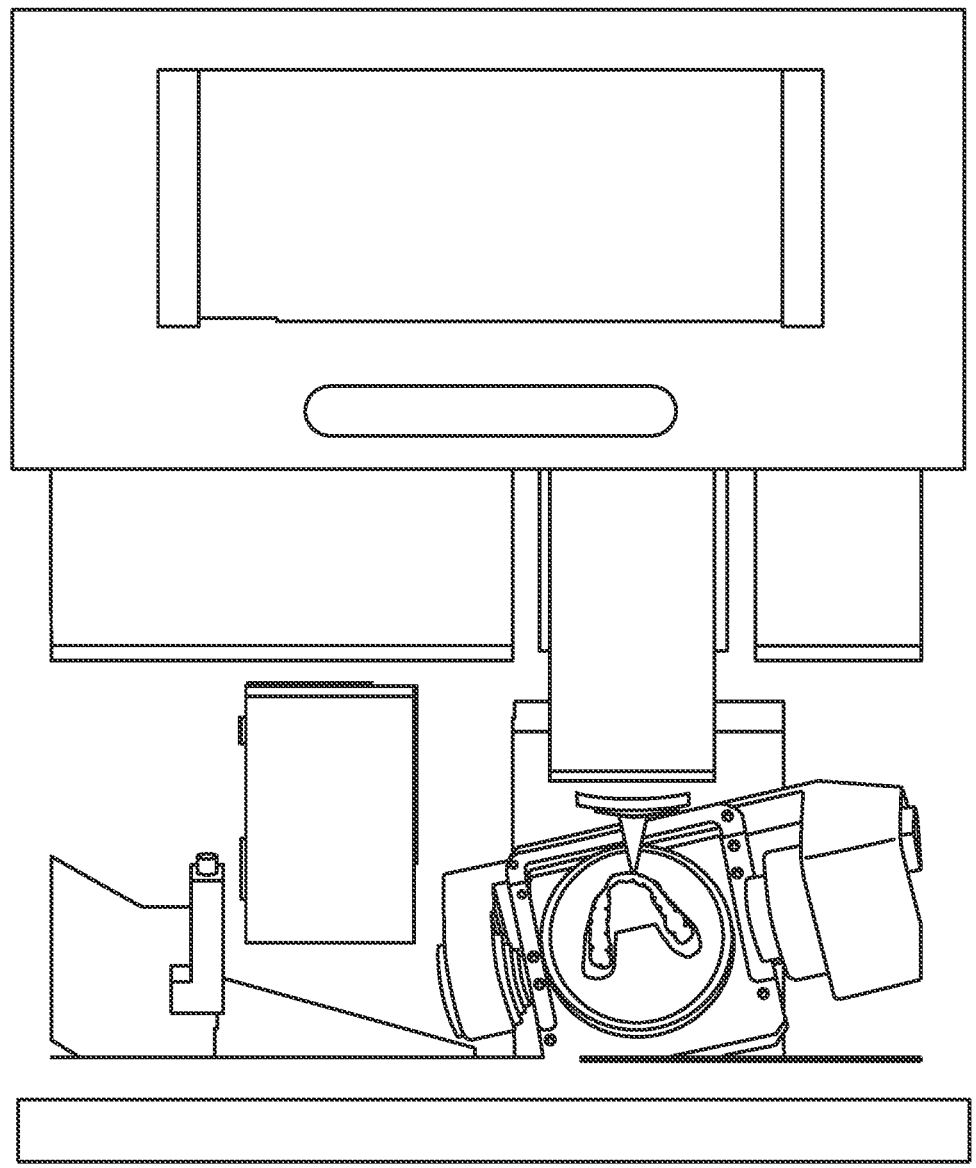
FIG. 31 is a front view of a 5-axis CNC machine showing a simulation of machining process, in accordance with some embodiments.

FIG. 31 is a front view of a 5-axis CNC machine showing a simulation of machining process, in accordance with some embodiments. Further, a simulation report associated with the machining process may be generated.

Figure 32:
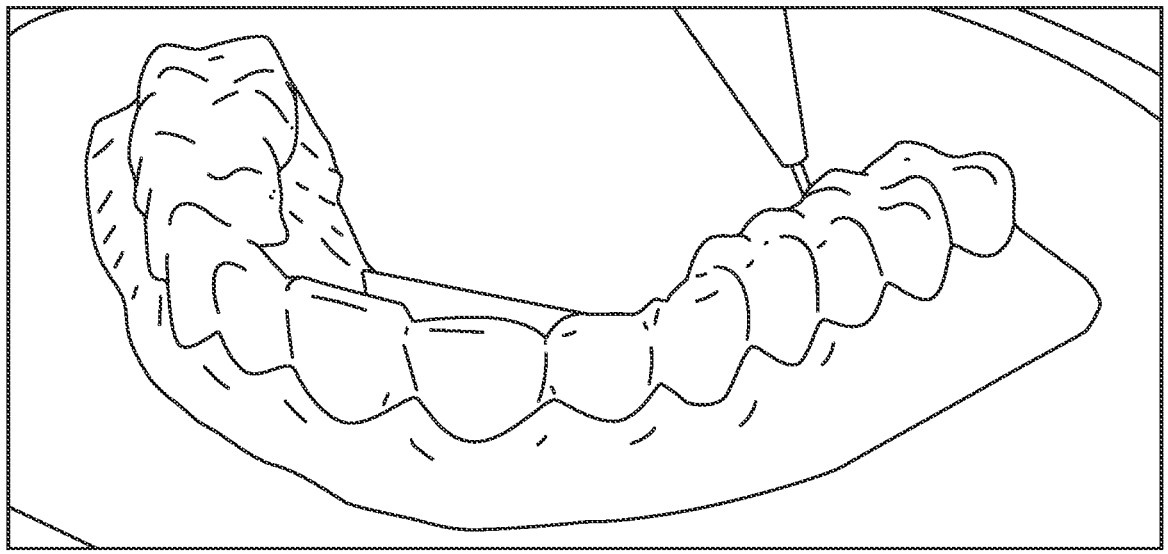
FIG. 32 is a front top perspective view of an aligner tray showing a simulation of machining process, in accordance with some embodiments.

FIG. 32 is a front top perspective view of an aligner tray showing a simulation of machining process, in accordance with some embodiments.

Figure 33:
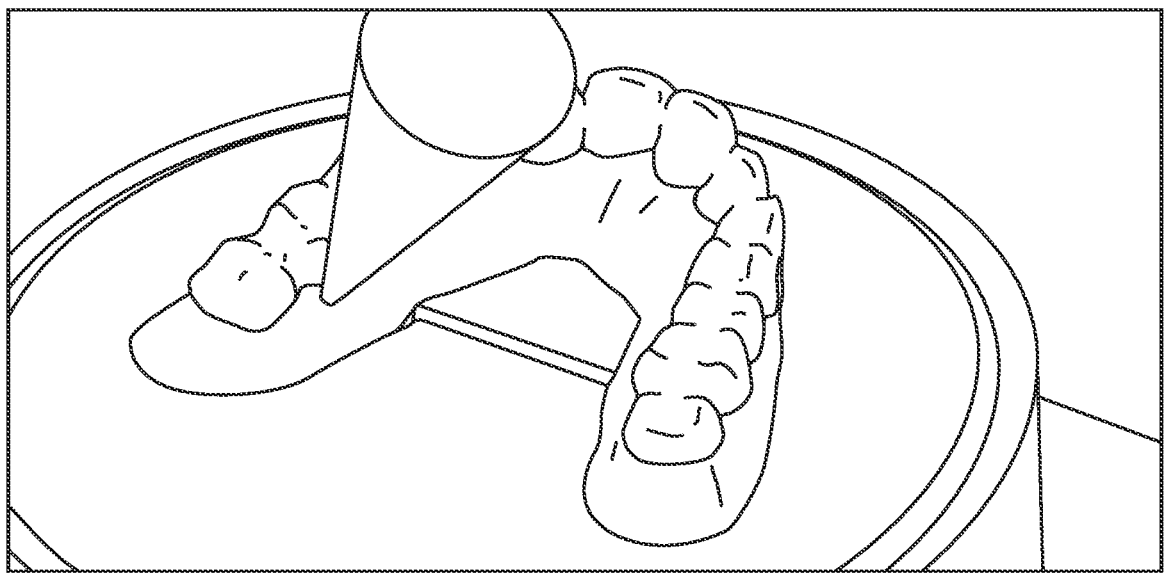
FIG. 33 is a rear top perspective view of an aligner tray showing a simulation of machining process, in accordance with some embodiments.

FIG. 33 is a rear top perspective view of an aligner tray showing a simulation of machining process, in accordance with some embodiments.

Figure 34:
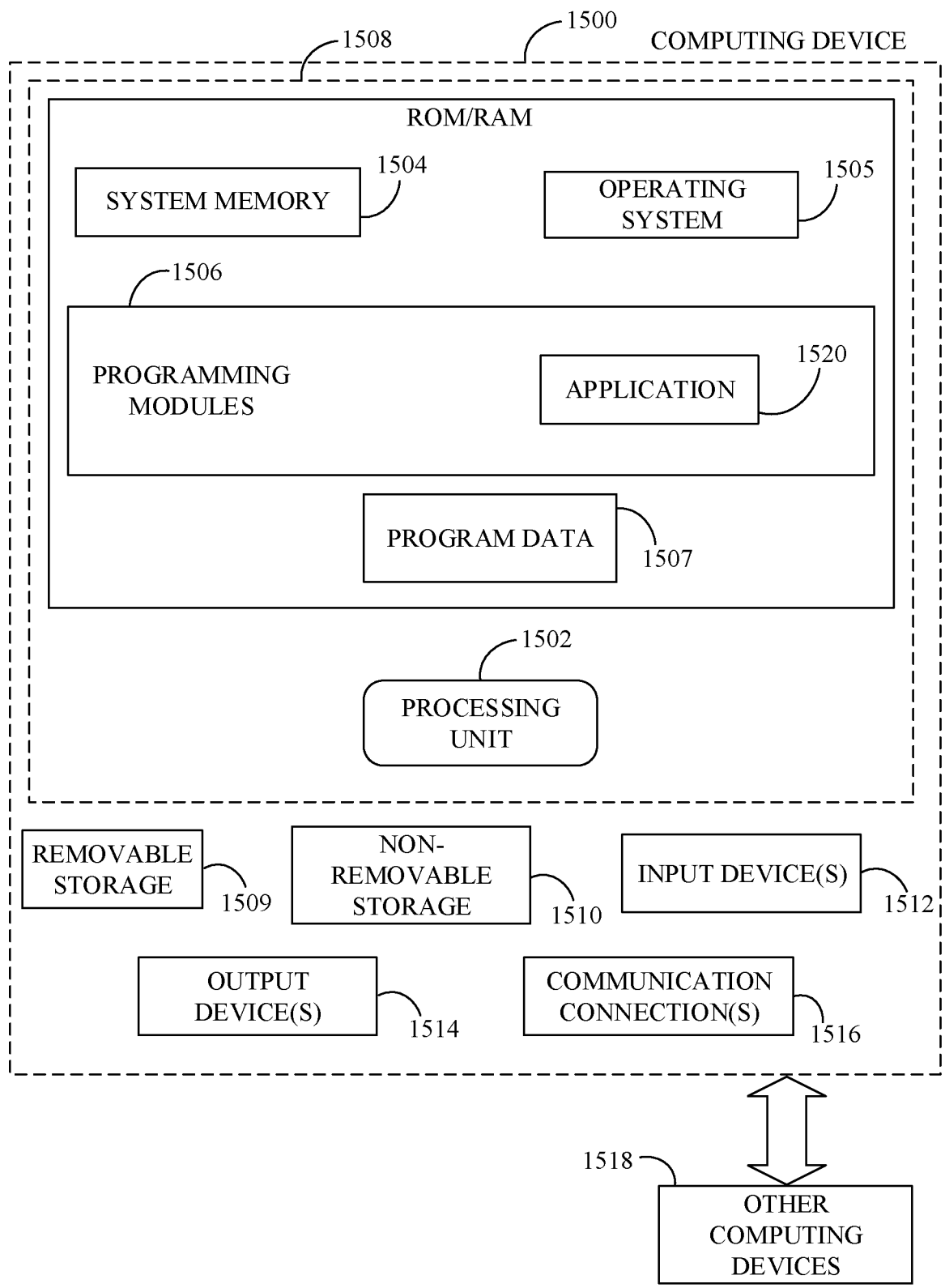
FIG. 34 is a block diagram of a computing device for implementing the methods disclosed herein, in accordance with some embodiments.

With reference to FIG. 34, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g., random-access memory (RAM)), non-volatile (e.g., read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 34 by a removable storage 1509 and a non-removable storage 1510. Computer storage media may include volatile and nonvolatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of the computing device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1504, including operating system 1505. While executing on processing unit 1502, programming modules 1506 (e.g., application 1520 such as a media player) may perform processes including, for example, one or more stages of methods, algorithms, systems, applications, servers, databases as described above. The aforementioned process is an example, and processing unit 1502 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention as hereinafter claimed.

What is claimed is:

1. A method of removing excess material from a dental appliance, the method comprising the steps of:
   (A) providing at least one 5-axis computer numerical control (CNC) machine and at least one administrator computing system, wherein the 5-axis CNC machine includes an automated tool;
   (B) providing at least one three-dimensional (3D) model managed by the administrator computing system, wherein the 3D model is a virtual representation of at least one dental appliance;
   (C) executing a line assessment process with the administrator computing system by outputting a trim line with the line assessment process, wherein the 3D model and the dental appliance are each delineated into a useful portion and at least one excess portion by the trim line;
   (D) generating a tool path for the automated tool in accordance to the trim line and the 3D model with administrator computing system;
   (E) relaying the tool path from the administrator computing system to the 5-axis CNC machine;
   (F) loading the dental appliance into the 5-axis CNC machine;
   (G) machining the dental appliance along the trim line with the automated tool, while guiding the automated tool along the tool path with the 5-axis CNC machine;
   (H) unloading the useful portion of the dental appliance as a finished product from the 5-axis CNC machine;
   providing a number of computational nodes along the trim line, wherein the line assessment process includes a desired low node threshold and a desired high node threshold during step (C);
   increasing the number of computational nodes with the administrator computing system, if the number of computational nodes is less than or equal to the desired low node threshold; and
   decreasing the number of computational nodes with the administrator computing system, if the number of computational nodes is greater than or equal to the desired high node threshold.

2. The method of removing excess material from a dental appliance, the method as claimed in claim 1 comprising the steps of:
   providing a plastic sheet and a 3D printer; and
   vacuum-thermoforming the plastic sheet into the dental appliance in accordance to the 3D model with the 3D printer during step (B).

3. The method of removing excess material from a dental appliance, the method as claimed in claim 2 comprising the steps of:
   providing a virtual orientation feature for the 3D model;
   providing a physical orientation feature for the dental appliance;
   further vacuum-thermoforming the plastic sheet into the physical orientation feature in accordance to the virtual orientation feature with the 3D printer during step (B); and
   orienting the dental appliance in accordance to the physical orientation feature with the 5-axis CNC machine during step (G).

4. The method of removing excess material from a dental appliance, the method as claimed in claim 1 comprising the steps of:
   providing the trim line as a predefined trim line for the 3D model; and
   executing the line assessment process with the administrator computing system before step (C) by inputting the predefined trim line into the line assessment process.

5. The method of removing excess material from a dental appliance, the method as claimed in claim 1 comprising the steps of:
   providing a virtual gums portion and a virtual teeth portion for the 3D model;
   scanning the 3D model for an intersection line between the virtual gums portion and the virtual teeth portion with the administrator computing system; and
   executing the line assessment process with the administrator computing system before step (C) by inputting the intersection line into the line assessment process.

6. The method of removing excess material from a dental appliance, the method as claimed in claim 5 comprising the steps of:
   providing an offset distance for the intersection line; and
   further executing the line assessment process with the administrator computing system before step (C) by inputting the offset distance into the line assessment process.

7. The method of removing excess material from a dental appliance, the method as claimed in claim 1 comprising the steps of:
   providing a virtual gums portion and a virtual teeth portion for the 3D model;
   calculating a statistical average for an intersection line between the virtual gums portion and the virtual teeth portion with the administrator computing system; and executing the line assessment process with the administrator computing system before step (C) by inputting the statistical average of the intersection line into the line assessment process.

8. The method of removing excess material from a dental appliance, the method as claimed in claim 1 comprising the steps of:
prompting to enter at least one manual user input for the trim line with the administrator computing system; and
executing the line assessment process with the administrator computing system before step (C) by inputting the manual user input into the line assessment process, if the manual user input is entered for the trim line with the administrator computing system.

9. The method of removing excess material from a dental appliance, the method as claimed in claim 1 comprising the steps of:
displaying the trim line with the 3D model with the administrator computing system after step (C);
prompting to enter at least one manual user edit for the trim line with the administrator computing system; and
applying the manual user edit to the trim line with the administrator computing system, if the manual user edit is entered for the trim line with the administrator computing system.

10. The method of removing excess material from a dental appliance, the method as claimed in claim 1 comprising the steps of:
providing at least one robotic arm;
loading the dental appliance into the 5-axis CNC machine with the robotic arm during step (F); and
unloading the finished product from the 5-axis CNC machine with the robotic arm during step (H).

11. The method of removing excess material from a dental appliance, the method as claimed in claim 1 comprising the steps of:
providing a plurality of spatial-positioning points managed by the administrator computing system during step (D), wherein the spatial-positioning points are occupied by the dental appliance;
mapping the tool path with the administrator computing system by positioning the tool path along the trim line;
further mapping the tool path with the administrator computing system by preventing intersection between the tool path and the spatial-positioning points;
further mapping the tool path with the administrator computing system by referencing a material thickness of the dental appliance; and
further mapping the tool path with the administrator computing system by referencing at least one kinematic limitation of the automated tool.

12. The method of removing excess material from a dental appliance, the method as claimed in claim 1 comprising the steps of:
simulating step (G) with the administrator computing system after step (D) in order to identify at least one potential collision between the automated tool and the dental appliance; and
outputting at least one error notification for the tool path with the administrator computing system, if the potential collision is identified between the automated tool and the dental tool.

13. The method of removing excess material from a dental appliance, the method as claimed in claim 1 comprising the steps of:
providing the automated tool as a waterjet tool; and
machining the excess portion of the dental appliance off the useful portion of the dental appliance with the waterjet tool during step (G).

14. The method of removing excess material from a dental appliance, the method as claimed in claim 1 comprising the steps of:
providing the automated tool as a milling tool; and
machining the excess portion of the dental appliance off the useful portion of the dental appliance with the milling tool during step (G).

15. The method of removing excess material from a dental appliance, the method as claimed in claim 1 comprising the steps of:
providing the at least one 3D model as a plurality of 3D models;
providing the at least one dental appliance as a plurality of dental appliances, wherein each of the plurality of 3D models is associated with a corresponding appliance from the plurality of dental appliances; and
executing a plurality of iterations for steps (C) through (H), wherein each iteration is executed with a specific model and the corresponding appliance, wherein the specific model is from the plurality of 3D models.

16. The method of removing excess material from a dental appliance, the method as claimed in claim 15 comprising the steps of:
providing a virtual identification for each 3D model;
providing a physical identification for each dental appliance;
further relaying the virtual identification of the specific model from the administrator computing system to the 5-axis CNC machine during step (E) of each iteration;
scanning the physical identification of the corresponding appliance with the 5-axis CNC machine after step (E); and
executing step (G) of each iteration, if the virtual identification of the specific model matches the physical identification of the corresponding appliance.

17. The method of removing excess material from a dental appliance, the method as claimed in claim 1 comprising the steps of:
providing a radiator for the 5-axis CNC machine; and
dulling at least one sharp edge of the final product with the 5-axis CNC machine after step (H) by concentrating heat towards the sharp edge with the radiator.

* * * * *